US006892186B1

(12) United States Patent
Preist

(10) Patent No.: US 6,892,186 B1
(45) Date of Patent: May 10, 2005

(54) AUCTION METHOD AND APPARATUS FOR ELECTRONIC COMMERCE

(75) Inventor: Christopher William Preist, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 572 days.

(21) Appl. No.: 09/661,463

(22) Filed: Sep. 13, 2000

(30) Foreign Application Priority Data

Sep. 15, 1999 (EP) .............................................. 99307307
May 19, 2000 (GB) ................................................. 0011986

(51) Int. Cl.[7] .............................................. G06F 17/60
(52) U.S. Cl. ........................................... 705/37; 705/26
(58) Field of Search .............................. 705/37, 26, 35

(56) References Cited

U.S. PATENT DOCUMENTS

| | | | | |
|---|---|---|---|---|
| 5,640,569 A | * | 6/1997 | Miller et al. ................. | 710/241 |
| 5,715,402 A | | 2/1998 | Popolo ........................ | 395/237 |
| 5,826,244 A | * | 10/1998 | Huberman .................... | 705/37 |
| 5,845,265 A | * | 12/1998 | Woolston ...................... | 705/37 |
| 5,966,699 A | * | 10/1999 | Zandi ........................... | 705/38 |
| 6,044,363 A | * | 3/2000 | Mori et al. .................... | 705/37 |
| 6,119,101 A | * | 9/2000 | Peckover ....................... | 705/26 |
| 6,401,080 B1 | * | 6/2002 | Bigus et al. ................... | 705/37 |
| 6,401,085 B1 | * | 6/2002 | Gershman et al. ............. | 707/4 |
| 6,408,283 B1 | * | 6/2002 | Alaia et al. ................... | 705/37 |
| 6,449,601 B1 | * | 9/2002 | Friedland et al. ............. | 705/37 |
| 6,499,018 B1 | * | 12/2002 | Alaia et al. ................... | 705/37 |
| 6,549,904 B1 | * | 4/2003 | Ortega et al. ................. | 707/10 |

FOREIGN PATENT DOCUMENTS

| | | | | |
|---|---|---|---|---|
| GB | 0987644 A2 | * | 3/2000 | |
| WO | WO 98/34187 | | 8/1998 | .......... G06F/17/60 |

OTHER PUBLICATIONS

Bidders Edge: Bidder's Edge Offers Online Shoppers the Best of eBay and Auction Universe, Dec. 21, 1998.* iTrack's Tommy Tracker Helps Subsribers Tailor Seaches Across Multiple Auction Sites, Jun. 29, 1999.*

Wurman, et al. "The Michigan Internet AuctionBot: A Configurable Auction Server For Human And Software Agents", pp. 301–308, May 13, 1998.

Maes, et al. "Agents That Buy And Sell", pp. 81–91, Mar. 3, 1999.

Tsvetovatyy, t al. "MAGMA: An Agent–Based Virtual Market For Electronic Comm rc ", pp. 501–523, Feb 3, 1998.

* cited by examiner

*Primary Examiner*—James S. McClellan
(74) *Attorney, Agent, or Firm*—Thomas, Kayden, Horstemeyer & Risley, L.L.P.

(57) ABSTRACT

An electronic trading entity (400) comprises a computing device having a processor, memory, user interface, and communications functionality, the computer entity comprising an algorithm (700) for monitoring a plurality of auction entities remotely over the internet; a algorithm (701) for calculating bids and for purchase of goods/services with a plurality of auction entities; an algorithm (702) for selecting individual auction entities with which to trade; a web browser (506) to allow a user to search for auction entities and add these to a stored list of entities at the bidding device. Bid calculation and offer calculation algorithms operate to optimally place bids at a lowest overall cost to the trading entity, or place offers with the object of obtaining the highest overall monetary figures for goods or services for sale by the trading entity.

32 Claims, 20 Drawing Sheets

| Outstanding 2.88 Carat Round Diamond VVS2 I |
| --- |
| Item #125854960 |

Jewelry, Gemstones:Gemstones:General

Desc.
| | | | |
|---|---|---|---|
| Currently | $11,500.00 (reserve not yet met) | First bid | $5,000.00 |
| Quantity | 1 | # of bids | 15 (bid history) |
| | | | (with emails) |
| Time left | 4 days, 20 hours + | Location | Portland, OR |
| Started | 07/01/99, 23:37:24 PDT | | (mail this auction to a friend) |
| Ends | 07/11/99, 23:37:24 PDT | | (request a gift alert) |
| | | | Featured Category Auction |

Bid!
| | |
|---|---|
| Seller | Hendrik (206) |
| | (view comments in seller's Feedback profile) (view seller's other auctions) |
| | (ask seller a question) |
| High bid | Manolod (0) |
| Payment | Money Order/Cashiers Checks, personal Checks, See item description for |
| | payment methods accepted |
| Shipping | Seller ships internationally, See item description for shipping charges |

Seller assumes all responsibility for listing this item. You should contact the seller to resolve any questions before bidding. Currency is dollar ($) unless otherwise noted.

Fig. 2
(Prior Art)

Bidding

Outstanding 2.88 Carat Round Diamond VVS2 I (Item #125854960)
eBay item 125854960 (EN...:24 PDT)—Outstanding 2.88 Carat Round Diamond VVS2

Current bid       $11,500.00
Bid increment        $100.00
Minimum bid      $11,600.00

Registration is required in order to bid. Find out how to become a registered user. It' fast and it's free!

To finalize your bid, you will need to submit your User ID and Password in the next step. You will not be asked to enter your User ID and Password anywhere on this page.

[    ]   Current minimum bid is $11,600.00   [ Review bid ]

Please type only numerals and the decimal symbol (.) if required. Do not include currency symbols such as $.

Your maximum bid.

Binding contract.
Placing a bid is a binding contract in many states. Do not bid unless you intend to buy this item at the amount of your bid.

Proxy bidding for all bids
Please bid the maximum amount you are willing to pay for this item. Your maximum amount will be kept secret; we will bid on your behalf as necessary by increasing your bid by the current bid increment up until your maximum is reached. This saves you the trouble of having to keep track of the auction as it proceeds and prevents you from being outbid at the last minute unless your spending limit is exceeded. (See an example of proxy bidding). Also, in case of a tie for high bidder, earlier bids take precedence. And, keep in mind that you cannot reduce your maximum bid at a later date. Unless otherwise noted, bids are in U.S. dollars.

If you have bid on this item before, note that your new bid must be greater than your previous bid.

Fig. 3 (Prior Art)

| Bid Identifier 1000 | Auction ID 1001 | Lot No./ID 1002 | Goods/Services 1003 | Lot size (Units) 1004 | Amount bid (US Dollars) 1005 | Time of bid (GMT) 1006 | Close time (GMT) 1007 | Status 1008 |
|---|---|---|---|---|---|---|---|---|
| 1278/99 | 372.278.596 | 1501 | 10k resistors | 10,000 | 25 USD | 10/2/99 -12.42 | 10/7/99 -17.00 | Active |
| 1279/99 | 281.502.7938 | 1720 | 10k resistors | 10,000 | 27 Euro | 10/2/99 -12.44 | 10/2/99 -18.00 | Active |
| 1280/99 | 282.702.6229 | 10 | Dell monitor Model 1010 | 25 | 2500 USD | 10/2/99 -12.50 | 10/2/99 -22.00 | Active |
| 1281/99 | 283.701.642 | 68 | HP monitor 2050 | 25 | 3000 Euro | 10/2/99 -12.59 | 11/2/99 -12.00 | Active |
| 1282/99 | 7298.73.25 | 1050231 | Dell monitor | 10 | 1100 Euro | 10/2/99 -13.02 | 11/2/99 -12.00 | Active |
| 1283/99 | 25.9827.532 | 98710 | Dell monitor | 5 | 600 USD | 10/2/99 -13.04 | | Active |
| 1284/99 | 123.789.258 | 10/A99G | Lexus 200 GLS Automobile | 1 | 25,001 USD | 10/2/99 -15.02 | 15/2/99 -17.00 | Outbid |
| 1285/99 | 372.278.596 | 1502 | 10k resistors | 10,000 | 27 USD | 10/2/99 -15.03 | 10/2/99 -17.00 | Active |
| 1286/99 | 372.278.596 | 1503 | 10k resistors | 10,000 | 28 USD | 10/2/99 -15.03 | 10/2/99 -17.00 | Active |
| 1287/99 | 281.502.7938 | 1724 | 10k resistors | 10,000 | 28 USD | 10/2/99 -15.04 | 10/2/99 -18.00 | Active |

Fig. 10

AUCTION METHOD AND APPARATUS FOR ELECTRONIC COMMERCE

FIELD OF THE INVENTION

The present invention relates to computing entities configured for electronic commerce, and particularly although not exclusively, to a method and apparatus for making bids and offers at electronic auctions over the internet.

BACKGROUND TO THE INVENTION

It is known on the internet that several commercial websites are present which serve the purpose of auctioning goods. Referring to FIG. 1 herein there is shown an example of a prior art system in which first and second commercial auction websites 100, 101 are each supported by a corresponding computer entity 102, 103 operating on a website server. A user of the auction websites over the internet 104 accesses the auction websites 100, 101 by use of his own computing entity 105. In FIG. 1, auction websites 100, 101 and the user are shown as logical entities (being websites supported by the computing entities) and the user operates a browser software 106 resident on the user's computer entity 105. Examples of such auction websites include those provided by eBay™ and QXL. A human user having a conventional personal computer equipped with a conventional browser software may use the browser software to access the auction websites over the internet in known manner, and using the browser may generate a screen display downloaded from the website which provides the user with an interactive interface on his computer entity 105 through which the user can participate in an auction hosted by the website servers 102, 103. To participate in an auction, a user typically must register with the auction site server by entering the user's details such as company name, personal name, credit card number, and address, in to dialog boxes provided on the website interface. The user accesses information concerning goods sold through the auction website.

Referring to FIG. 2 herein, there is illustrated schematically aspects of a typical user interface display of a known auction website, which a human user can access on his or her graphical user interface by pointing a browser software at the website. Typically such a display comprises a listing of goods or services to be sold, a quantity of goods or services, a current highest bid price which is being bid for the goods or services, a number of bids which have been received by the website for those goods or services, a time at which the auction started, and a time at which the auctioning of the goods or services may close, as well as other details concerning payment method and shipping terms.

Referring to FIG. 3 herein there is illustrated an example of a prior art screen display accessed by a user for making a bid. A user enters an amount which the user bids for the goods using a dialog box provided. The bid is relayed over the internet to the website, which inputs the bid information into its controlling software to determine whether or not the bid is successful. Once the auction software accepts a successful bid, a confirmation message is sent to the computing entity of the successful bidder, and a transaction, including supply of goods and payment for goods, occurs by conventional means, for example postal delivery of goods and conventional credit card transaction clearance.

It is known in prior art systems to provide at a known auction website a software functionality known as a bidding elf, which is provided as part of an auction website, and which is capable of bidding in an auction on behalf of a buyer. The bidding elf provides a user with a screen display having dialog boxes into which the user can enter an upper maximum limit to which he or she is prepared to bid for various goods. The bidding elf then places bids on behalf of the user, varying the bid level incrementally up to the maximum predetermined limit set by the user. The bidding elf removes the need for the user to sit at his visual display continuously to monitor current bidding whilst the auction is occurring and continue to increase his bid incrementally up to his maximum bid.

With known electronic auctions, generally a user can only attend one auction at any one time, since the website browser can only be pointed at one auction at any one time and the user interface of one auction website can be displayed on a single monitor at any one time. If a user wishes to attend more than one auction simultaneously, in order to source goods or services at the best price from several auctions, then the user must arrange a plurality of website browsers supported by one or more computing entities to communicate with the plurality of auctions, and must visually monitor each separate auction site simultaneously. Such a system is possible, using conventional technology, but is inelegant, requiring several items of computing equipment by the user, and requiring manual monitoring and interaction of several auction sites at once. The prior art bidding elf can only make bids in one auction, being the auction website with which it is associated. Different prior art elves at different websites cannot communicate with each other to coordinate bidding in several auctions.

SUMMARY OF THE INVENTION

One object of the present invention is to provide a method and apparatus to enable a user to participate in several electronic auctions simultaneously in a controlled and coordinated manner to obtain a best price contract for goods and services from a plurality of auctions. In one implementation, a user may set an upper and/or lower price limit for bid or offer of goods or services at a plurality of auctions, and thereby participate in risk free buying or selling of goods and services. The user may be guaranteed that the maximum price bid will not be exceeded, or a minimum price offered will not be exceeded in specific embodiments of the invention.

Specific embodiments may enable a user to obtain items at a preferential rate in one auction whilst participating in one or more other auctions for the same goods/services and whilst avoiding buying of more goods than required, or selling more goods than required through participating in other ones of the plurality of auctions.

According to first aspect of the present invention there is provided an electronic trading entity comprising:

a processor;

a memory means;

a communications means;

monitoring means for monitoring a plurality of trading data displayed by a plurality of auction entities;

quantity calculation means for calculating quantities of items for trading with said plurality of monitored auction entities, price calculation means for calculating optimal prices of items to be traded with said plurality of auction entities;

wherein said price calculation means operates to process said trading data to obtain trading prices for a quantity of items calculated by said quantity calculation means, said prices calculated for a set of chosen auction entities selected from said set of all said plurality of auction entities;

said price calculation means operating to process said selected data to obtain trading prices for a predetermined amount of items across all said selected set of said plurality of auction entities.

Preferably the electronic trading entity further comprises search means for searching electronically for individual ones of said auction entities.

Preferably said amount calculation means comprises:

means for storing bid data describing a plurality of bids in at least one of said plurality of auction entities;

means for storing user bid data describing a number of bids placed by said trading entity with at least one of said plurality of auction entities; and means for determining an optimum number of bids and corresponding price amounts of said bids to place with at least one of said plurality of auction entities.

According to a second aspect of the present invention there is provided a method of operating an electronic trading entity for trading a plurality of tradable items, said method comprising the steps of:

monitoring a plurality of auction entities;

inputting a plurality of trading data from said plurality of auction entities;

processing said trading data of said plurality of auction entities to determine an optimum set of amount data describing quantities and prices of said tradable items for trading by said trading entity.

Said step of processing trading data of said plurality of auction entities may comprise:

storing in memory a plurality of bid data displayed by said plurality of auction entities;

determining a number of active bids of said trading entity already sent by said trading entity to at least one of said plurality of auction entities;

constructing a plurality of currently successful sets of said bid data of said plurality of auction entities;

determining a cost to outbid each said set of currently successful bids;

selecting a said currently successful set of bids having an optimum cost to outbid; and constructing a set of bids of said trading entity which are higher than corresponding bids of said optimum cost currently successful bid set.

Said step of constructing a set of bids of said trading entity which are higher than said optimum cost currently successful bid set may comprise:

for each bid of said optimum bid set, said bid made either by said trading entity or a third party, selecting a highest third party bid appearing in an identical auction entity to said bid, which also appears in said optimum bid set; and generating a trading entity bid of an amount equal to said highest third party bid plus a minimum bid increment.

Said step of processing said trading data of said plurality of auction entities may comprise:

storing in memory a plurality of offer data of said plurality of auction entities;

determining a number of active offers already placed by said plurality of auction entities;

constructing a plurality of sets of offers of said auction entities;

determining a value of each of said set of auction entity offers;

selecting a set of auction entity offers having an optimum value to undercut with new offers;

determining whether said value is within a predetermined value limit; and generating a set of offer data matched to said optimum set of offer data.

Said step of processing data may comprise:

storing a plurality of offers of a plurality of auction entities, selecting a plurality of sets of said plurality of offers, each set having a number of members equal to a number of items to be obtained by said trading entity;

for each said selected set, determining a value of said set;

selecting a said set having a maximum value; generating a set of offers which correspond with said set having said maximum value.

Said step of generating a set of offers may comprise:

for each offer of said set of optimum offers, generating an offer having value equal to the corresponding respective offer value, minus a predetermined amount.

According to third aspect of the present invention there is provided a method of exchanging data between an electronic trading entity and a plurality of electronic auction entities, said method comprising the steps of:

said trading entity monitoring data displayed by said plurality of auction entities;

said first trading entity extracting from said monitored data, data describing prices of individual items to be traded;

said first trading entity determining from said price data an optimum set of trading data for sending to said plurality of auction entities; and said first trading entity communicating said trading data to said plurality of auction entities.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 2 illustrates schematically an example of a typical prior art user interface display of a known auction website;

FIG. 3 illustrates schematically further features of the typical prior art user interface display of the known auction website;

FIG. 10 illustrates schematically a data table recording data describing a plurality of bids and/or offers which the trading entity is actively pursuing at a plurality of auction entities;

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation'to these specific details. In other instances, well known methods and structures have not been described in detail so as not to unnecessarily obscure the present invention.

A first specific implementation according to the present invention is concerned primarily with electronic commerce according to the 'English auction' system in which a seller takes competing bids from a plurality of bidders, with a current highest bid price from one of the bidders being the price which other bidders must exceed in order for a successful transaction to occur. Where the highest bid price is not exceeded for a predetermined period, the seller may choose to either withdraw the goods from auction if his reserve price is not met, or the seller may enter into a transaction with the bidder making the highest bid in the auction.

Throughout this description, transactions concerning goods or services will be referred to. Where a transaction to buy or sell a good is mentioned, it will be understood that the subject of the transaction may be either a good or a service or both a good and service, the terms good and service being used interchangeably, and similarly a reference to a transaction involving a service will be construed accordingly to include a transaction involving a good.

In this specification the term "lot" is used to refer to a minimum quantity which is subject to a single transaction. A number of individual goods or services comprising a lot may be defined by a user of a computer trading entity according to specific implementations of the present invention described herein or may be specified by an entity with whom the computer trading entity trades. A user may define a lot size for any particular type of good or service as being one, or a preset plurality of goods or services.

Figure 1:
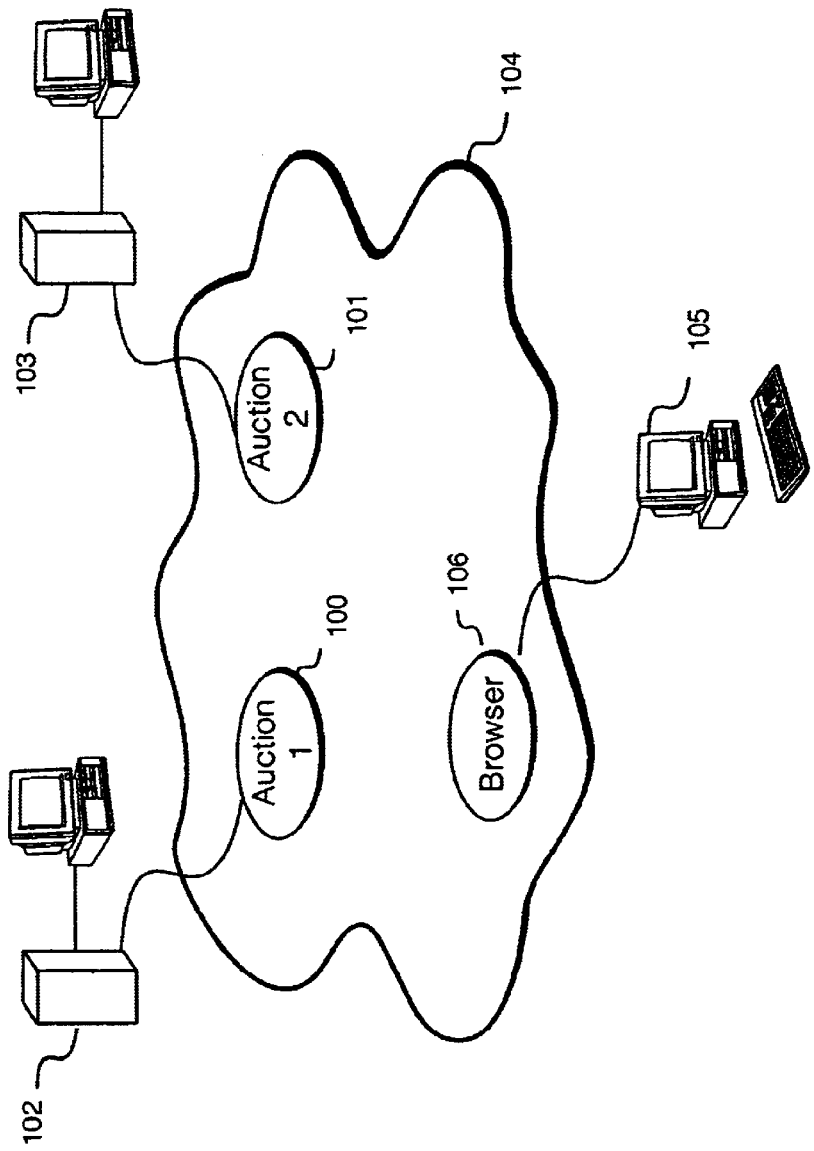
FIG. 1 illustrates schematically an example of a prior art system in which first and second commercial auction websites are each supported by corresponding computer entity.
Figure 4:
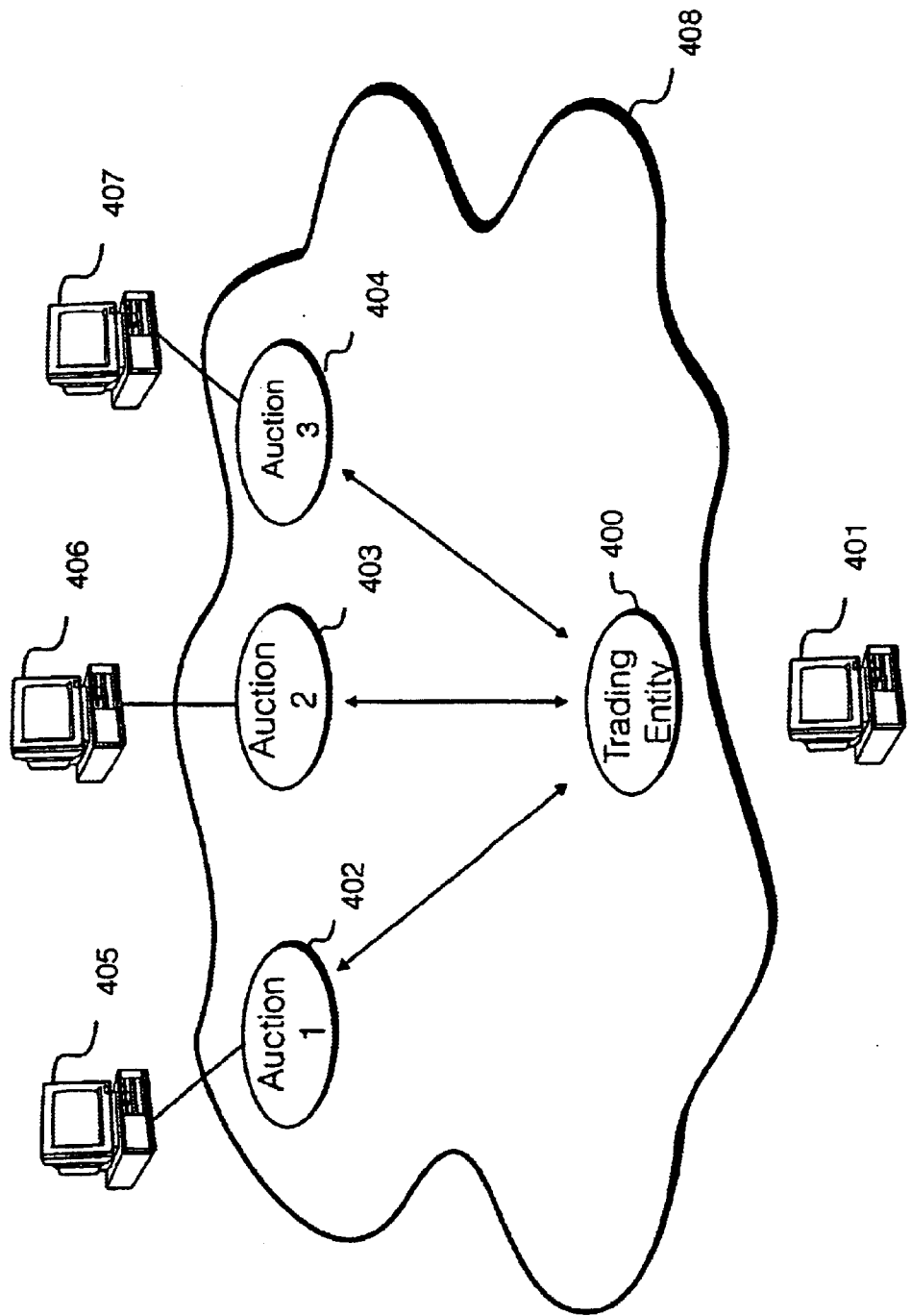
FIG. 4 illustrates schematically operation of a trading entity according to first specific implementation of the present invention in an internet environment.

Referring to FIG. 4 herein, there is illustrated schematically an interaction of a trading device 400 according to a first specific implementation of the present invention with a plurality of auction entities 402–404. The trading device comprises a computer program operating to control a first computing entity 401 comprising a data processor and memory means. Each auction entity comprises a computer program operating a corresponding computing entity 405–407, the computing entities each comprising a data processor and associated memory means, the trading device 400 communicating with the one or plurality of auction entities over the internet 408.

Figure 5:
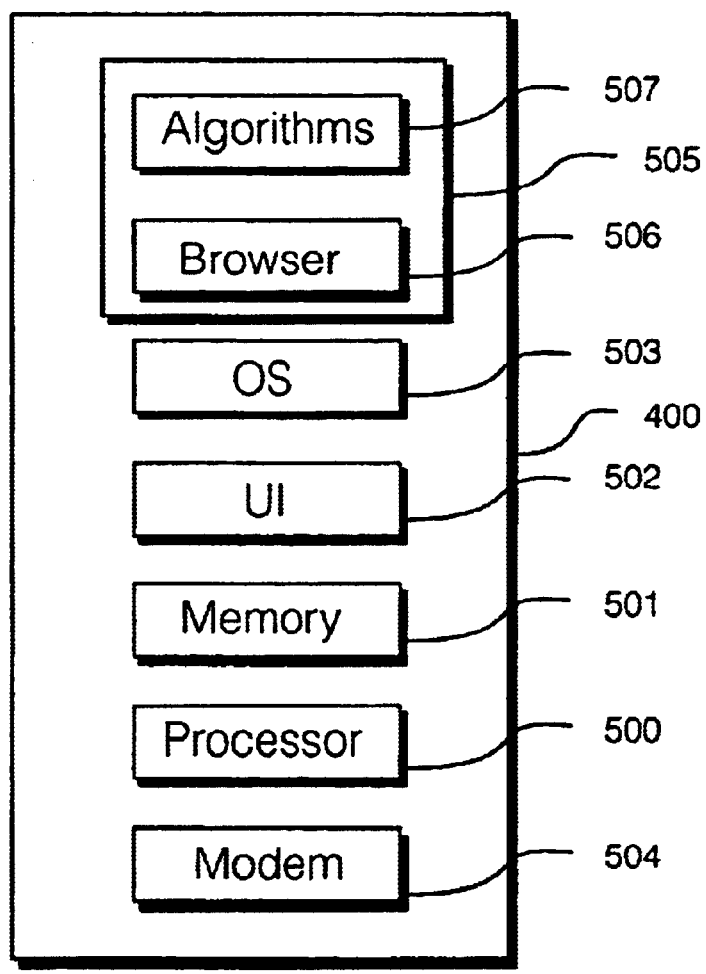
FIG. 5 illustrates schematically an architectural structure of the trading entity of FIG. 4.

Referring to FIG. 5 herein, there is illustrated schematically an architectural structure of trading device 400. The trading device comprises a data processing means 500; an area of memory 501 for storage of data and instructions used by processor 500; a user interface 502, comprising a video display screen, keyboard and pointing device, for example a mouse device; an operating system 503, for example the known Unix™ operating system, Microsoft Windows™ operating system, or Linux™ operating system; a modem 504 for communicating with other internet devices; a plurality of applications 505, including a web browser 506, and a set of algorithms 507 for placing bids and offers at auction sites, the algorithms 507 co-operating with web browser 506. The web browser 506 may comprise a conventional web browser, for example the known Microsoft Internet Explorer™ browser.

Figure 6:
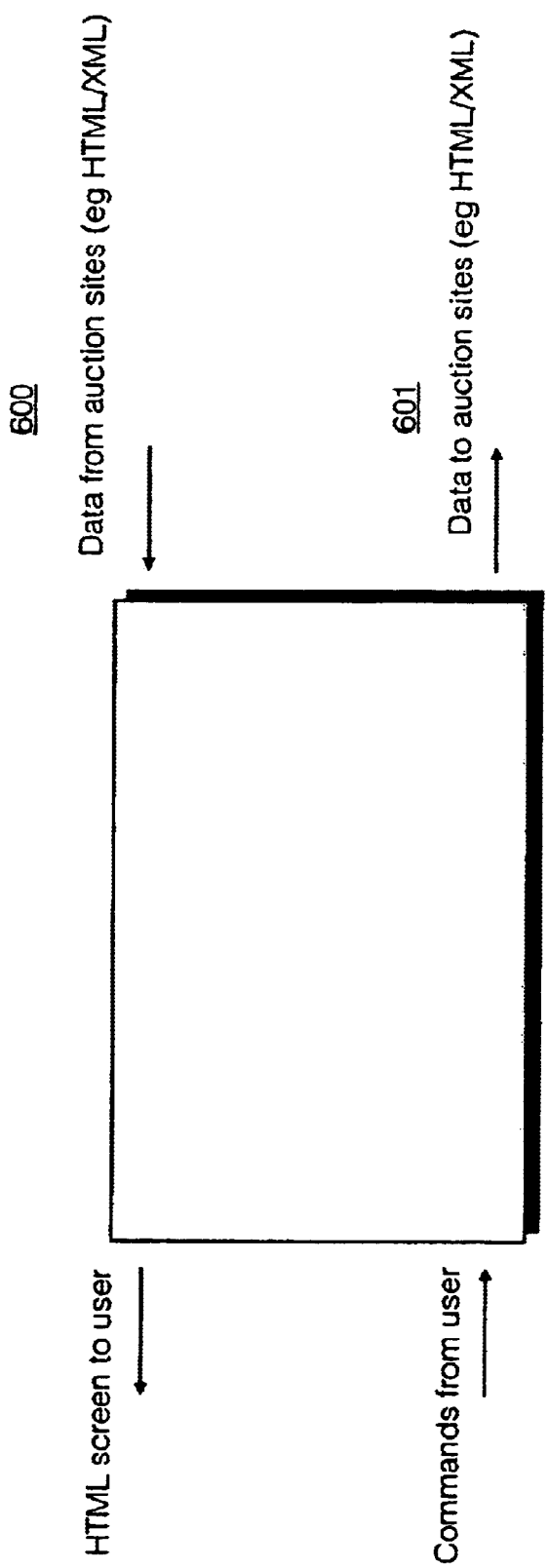
FIG. 6 illustrates schematically interaction of the trading entity with a plurality of auction entities over the internet and interaction of the trading entity with a user.

Referring to FIG. 6 herein, there is shown schematically communication of trading device 400 with the plurality of auction entities, and with a user of the device. Trading device 400 receives hypertext mark-up language (HTML) or XML signals 600 from the auction entities, and sends data 601, also in HTML or XML to the auction entities over the internet. Trading device 400 communicates with the user interface using HTML signals, and can receive data input and commands from a user via the user interface, for example by the user typing in commands, or using the pointing device.

The trading device comprises a local set of software commands on the computer entity 401, which operate to parse information from the auction entities, and receives HTML signals, in the same way as the web browser. The trading device extracts information from the HTML signals concerning a current status of an auction entity, including information on a highest current bid and the bidding increments set by the auction entity.

The trading device 400 contains a plurality of algorithms for interacting with the user and one or more auction entities as will now be described.

Figure 7:
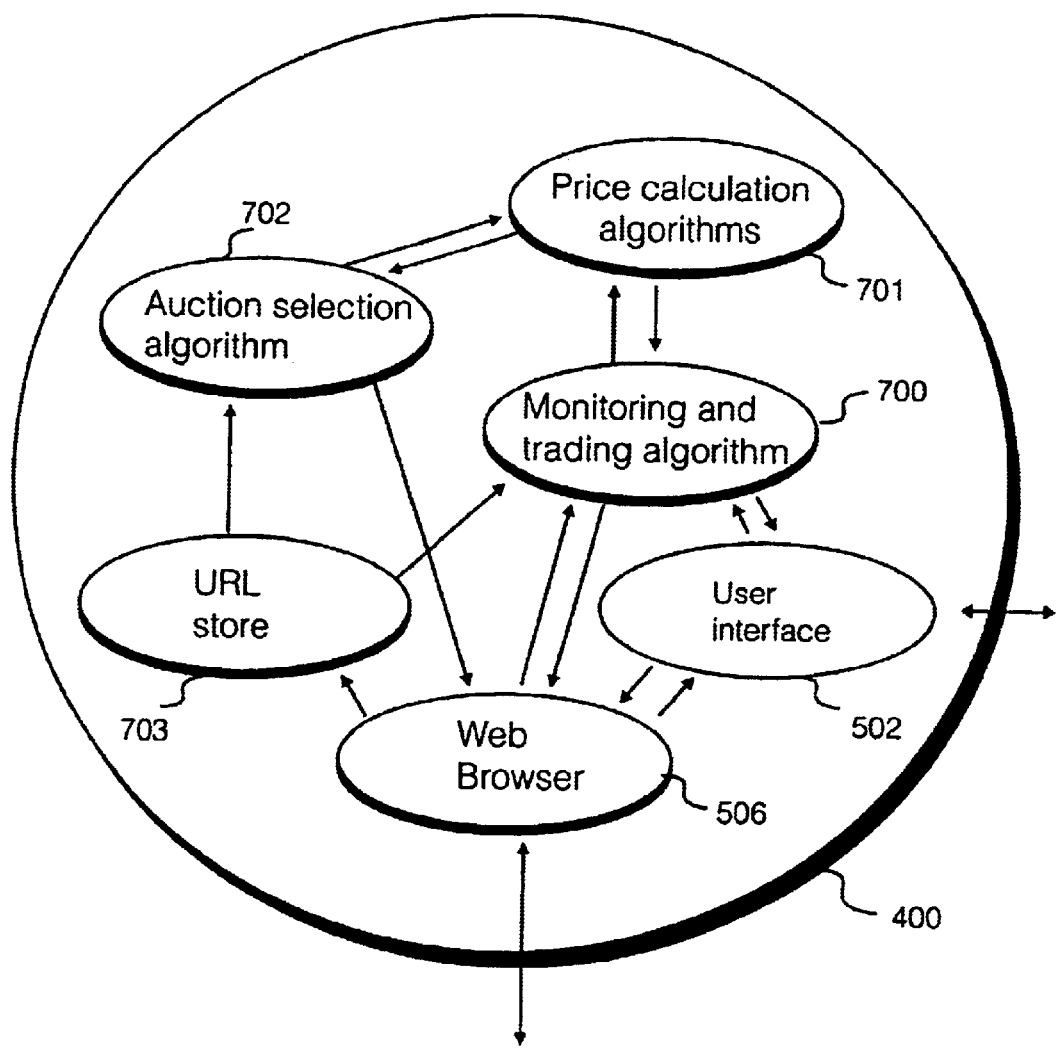
FIG. 7 illustrates schematically a logical layout of the trading entity of FIG. 4.

Referring to FIG. 7 herein, there is illustrated a logical layout of trading device 400 including arrows indicating flows of data between logical components of the trading device 400. Trading device 400 comprises a web browser 506; monitoring and trading algorithms 700; one or more price calculation algorithms 701, an auction selection algorithm 702, and a URL store 703. Web browser 506 may monitor one or a plurality of auction entities under control of monitoring and trading algorithm 700. Monitoring and trading algorithm 700 interacts with price calculation algorithm 701 to obtain information concerning calculated optimum prices and lowest/highest prices. Price calculation algorithm 701 communicates with auction selection algorithm 702 for selecting auction entities having the best prices for selected goods or services. URL store 703 stores URL addresses of selected auction entities which are referred to by the auction selection algorithm 702 and monitoring and trading algorithm 700. User interface 502 communicates with web browser 506, and monitoring and trading algorithm 700, so that a human user of the trading device can monitor and participate in trades carried out by the monitoring and trading algorithm 700 and actively search and select auction entities using web browser 506. Each of monitoring and trading algorithm 700 and web browser 506 are capable of communicating with auction entities via the modem facility 504 of the host computer entity, via the internet.

Whilst communications between the trading device and the auction entities are described herein as being carried out in HTML or XML, protocols operated by the trading device 400 for communication in the general sense is not limited to these languages, and in the general case communication may occur by other standard interfaces, for example FIPA (foundation of intelligent physical agents) defined languages.

In some embodiments, algorithms for communicating with agent entities may reside within a web browser, in which case the algorithms may generate HTML driven screens which the user may review using his conventional web browser. Information which the trading device displays to the user includes information concerning the status of a set of auction sites selected by the user.

The trading device may be directed to web sites by a user typing in addresses of known websites, using the URL of the websites, or alternatively a communication algorithm within the device may be configured to use the browser to search for auction sites by entering in a keyword search via the browser, into a conventional search engine, e.g. Yahoo™ or Alta Vista™.

A user of the trading device needs to have confidence in the integrity and reliability of the auction entities which the trading device is communicating with. Consequently, in the best mode implementation, rather than leave selection of auction entities to the trading device, a user may select a plurality of auction entities with which the trading device communicates, for example by inputting the URL data of selected auction entities to the trading device, which the trading device stores in URL memory store 703. Other user inputs to the trading device include:

A list of goods or services which the user wishes to buy, sell or monitor for. Goods need not necessarily be actively bought or sold, but can be monitored and a user alerted to any particular goods of interest when these arise on an auction site.

Information concerning auctions which the user wishes to participate in. This information may include a general instruction to participate in any auction which the user has preselected and has entered its URL into the trading device.

A quantity of goods or services to buy or sell. This data may comprise a maximum quantity of goods or services to buy or sell, and a minimum quantity of goods or services to buy or sell. For example, when buying or selling electronic components, lots of 1000 units are common, and lots of 100 units or lower are generally not traded.

In the case of a buy instruction from the user to the trading device, information describing an upper bid price limit (and currency type) which the user is prepared to pay without the trading device referring back to the user.

In the case of buying goods or services, an absolute upper bid price limit and currency above which the user is unwilling to purchase the goods or services.

In the case of selling goods or services, a lower offer limit below which the user requires referral of price information before selling the goods or services.

In the case of selling goods or services, an absolute lower offer limit below which the user is unwilling to sell the goods or services.

If the user is buying, and the goods are within the user's upper bid limit, the trading device may buy goods and services automatically without further referral to the user. Similarly, if the user is selling goods and services and the prices obtained are above the users lowest offer limit, the trading device may sell goods and services automatically without further referral to the user.

Figure 8:
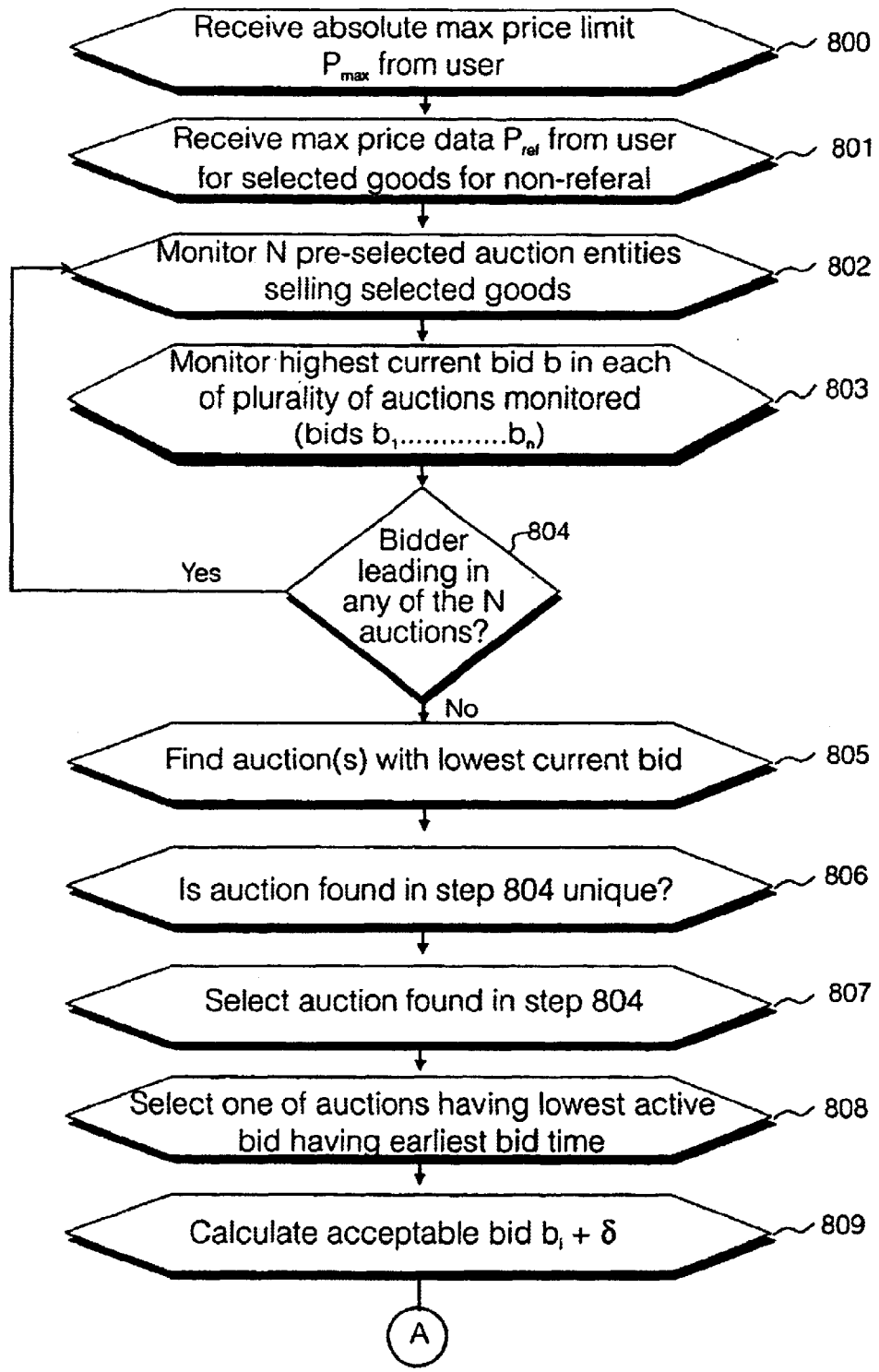
FIG. 8 illustrates schematically process steps carried out by the trading entity for procuring a single good or item from a plurality of auction entities.
Figure 8B:
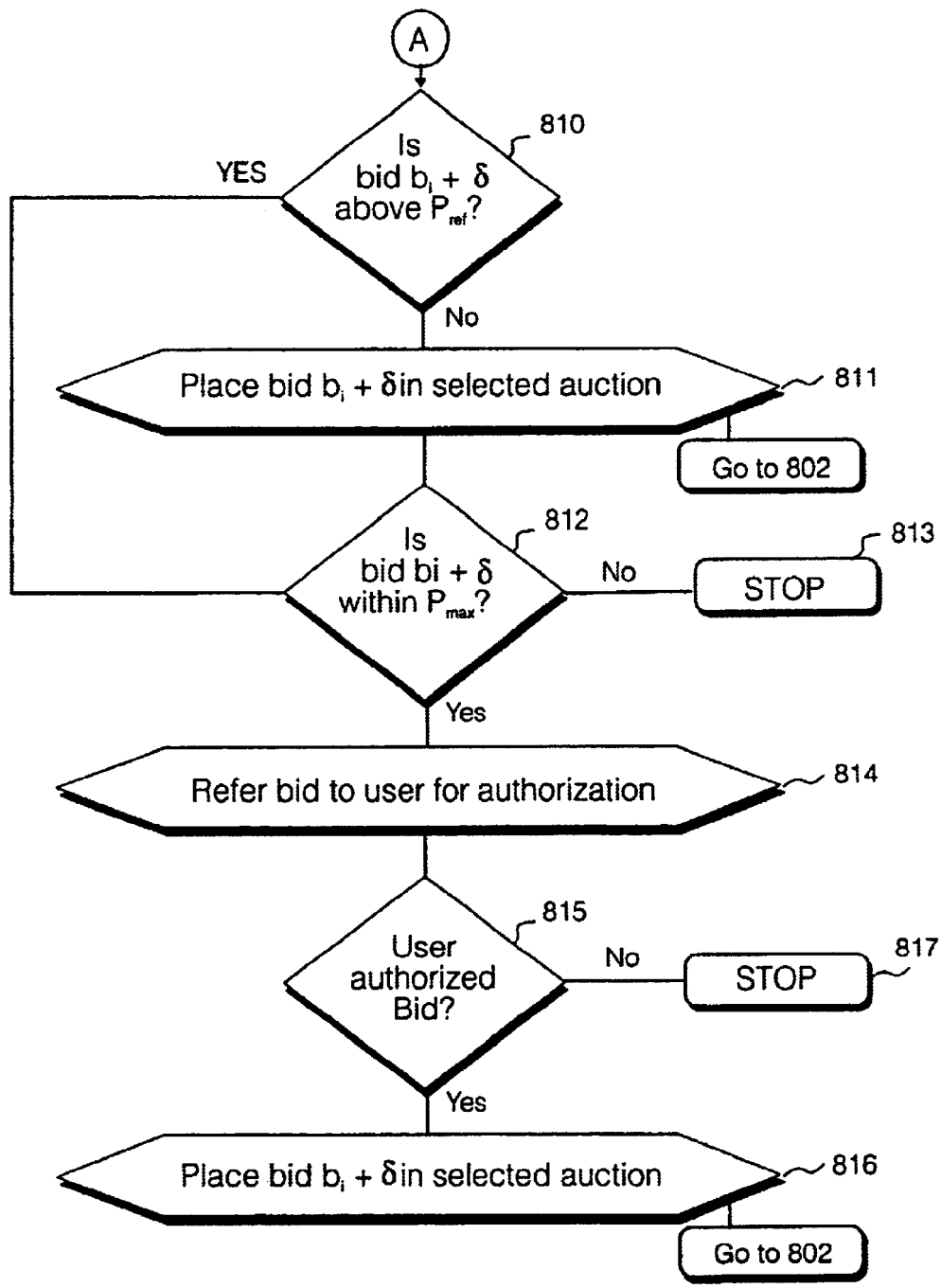

Referring to FIG. 8 herein, there is illustrated steps of a simple algorithm for purchasing one lot of goods or service only from one of a plurality of N auction entities.

In step 800, the user inputs a maximum price limit $P_{MAX}$ being a price which should never be exceeded in any of the N auctions for a quantity of goods or services.

In step 800, the user inputs a maximum price data $P_{MAX}$ into his user interface, which is received by trading device 400. In step 801, the user enters a referral price $P_{REF}$, which is a price above which any bids to be made by the device must be referred back to the user before proceeding. In step 802, the trading device monitors a plurality N of pre-selected auction entities, which have previously been selected by the user, and which are selling the goods or services of interest to the user. In step 803, the trading device monitors the current highest bids b in each of the plurality of N auctions monitored. This results in a plurality of bids $b_{1i}, \ldots b_N$, being the current highest bid operating in each of the N auctions. In step 804, if the trading device has a currently entered bid in any of the N auctions, which is the highest bid in that auction, that is to say if the trading device is actually leading the bidding in any one of the plurality of N auctions, then the algorithm idles, and continues to monitor the N auctions and current bid prices in steps 802, 803 as described previously. However, if the trading device is not currently leading the bidding in any one of the N auctions, in step 805 the algorithm selects the auction having the lowest current active bid (the active bid being the highest bid in that auction) in step 805. In step 806, it is checked whether there is more than one auction having an equivalent lowest active bid. If there is only one such auction, then in step 809, the algorithm calculates a bid at the level $b_i+\delta$ in the selected auction i. However, if there is more than one auction having a lowest active bid price, that is to say that there is a same lowest active bid price for the goods or services in more than one auction, then the algorithm selects from these the auction having the earliest finish time, and the lowest active bid price in step 807. In step 808, the algorithm then proceeds to calculate a bid $b_i+\delta$ in the selected auction i, where $\delta$ is the smallest bid increment acceptable in that auction i. In step 810 the algorithm compares the bid $b_i+\delta$ with the price limit above which all bids must be referred to the user $P_{REF}$. If the bid $b_i+\delta$ is below the referral limit $P_{REF}$, in step 811, the algorithm proceeds to place the bid $b_i+\delta$ in the selected auction and returns to monitoring state 802. However, if the bid $b_i+\delta$ is above the limit $P_{REF}$ above which all bids must be referred to the user, in step 812, the algorithm compares the bid $b_i+\delta$ with the absolute maximum price limit $P_{MAX}$ set by the user to see if it is below $P_{MAX}$. If the calculated bid exceeds $P_{MAX}$ then the algorithm stops and no further bidding takes place. The algorithm stops in step 813. However, if the calculated bid $b_i+\delta$ is within the maximum upper price limit $P_{MAX}$, in step 814, the algorithm refers the bid to the user for authorization. If the user authorizes the bid in step 815, then the bid $b_i+\delta$ is placed in the selected auction in step 816 and returns to monitoring step 802. However, if the user does not authorize the bid, or rejects the bid $b_i+\delta$ then in step 817, the algorithm stops and no further bidding takes place.

The above algorithm ensures that the user always has a leading bid in one of the plurality of N auctions, placing the lowest possible bid to take a lead in one of the plurality N auctions and without placing a bid in any other auction than the one in which the lowest possible bid is placed until that bid is overtaken. When the users bid is overtaken in the auction in which the user is bidding, the algorithm selects the next auction having the lowest active bid price and places a bid in that auction. This auction may be the same auction as the one in which the user has just been outbid in, or may be a different auction of the plurality N auctions. The algorithm is always searching for the lowest current active bid which allows the user to lead in one of the plurality N auctions for the required single lot of goods or services, and always below the users referral price limit $P_{REF}$ which the user is prepared to pay without the trading device referring back to the user.

The referral mechanism provided where a bid is above the users price limit above which all bids need to be referred back to the user $P_{REF}$, but below the user's absolute maximum price limit $P_{MAX}$ above which the user will never want to bid for the lot of goods or services, is provided primarily to give the user confidence in the trading device and gain acceptance of the bidding system from the user. However, an optimally behaving user should not use the referral mechanism, but should set his maximum price limit above which he would never wish to pay to be the same as the price limit above which referrals should be made, that is to say $P_{REF}=P_{MAX}$. The trading device will never pay more than the upper limit set by the user, and will not reveal that upper limit to the auction, or to competing bidders.

Figure 9:
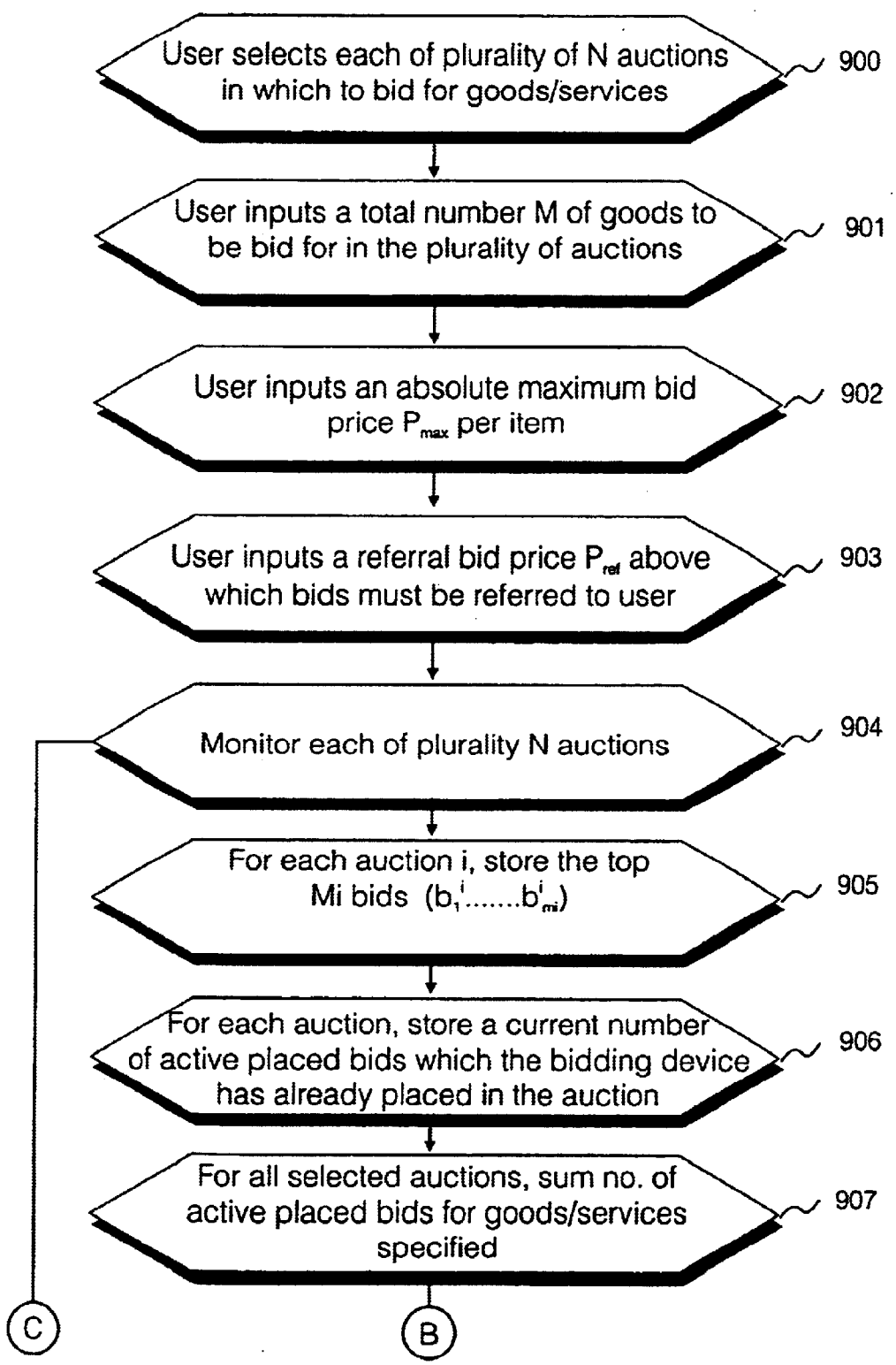
FIG. 9 illustrates schematically process steps carried out by a monitoring and trading component of the bidding algorithm for bidding for several goods or services at once from a plurality of auction entities.
Figure 9B:
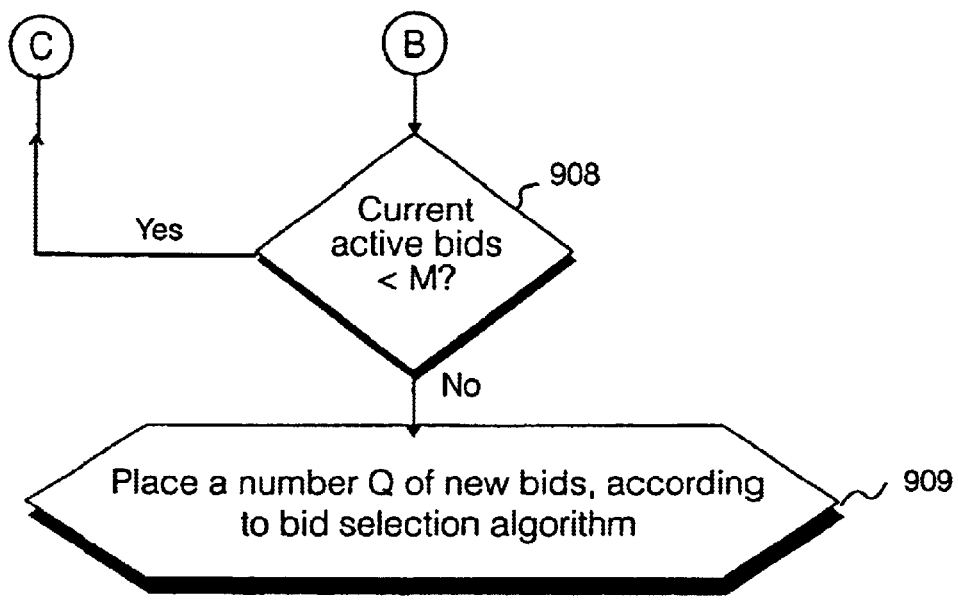

Referring to FIG. 9 herein, there is illustrated schematically an example of procedure steps carried out by monitoring and trading algorithm 100 for bidding for several lots of goods or services at once at a plurality of auction entities. A number M goods of a specified type are to be purchased from a plurality of N auctions at an optimal overall price, that is to say, the best prices available throughout the N auctions where an auction house may run one or more auctions for a given good. Using this algorithm, some of the plurality M goods may be bought at different prices to others, but overall, the best prices for the M goods are obtained, subject to availability, at the plurality N of auctions. In each of the auctions, different bidders may bid a different price per good for different lots of goods where the price depends on the quantity traded. For example, a first bidder may bid say $500 each for 5 items (5 lots) whereas in another auction, another bidder may bid $450 per item for 10 items (10 lots) of the same goods.

The algorithm of FIG. 9 deals with the feature of the bid price per lot being dependant upon the size of transaction by treating each of the M lots to be traded separately, and attaching a separate bid price to each one of the plurality M lots to be bid for. Therefore, in the algorithm, instead of bidding $2,500 for 5 lots, the algorithm breaks the transaction down into 5 individual bids of $500 for each one of 5 lots, resulting in 5 bids instead of 1 bid in this example.

In step 900, the user selects each of the plurality of N auctions in which the user wishes to bid for the goods or services. This may be achieved by selecting the auctions using a conventional web browser and inputting the URL of each selected auction into the trading device. In step 901, the user inputs the single type of good or service, and the total number of lots M of the good or service to be bid for in the plurality N auctions via the user interface 502. In step 902, the user inputs an absolute maximum bid price $P_{MAX}$ per lot, which the user is prepared to pay. A lot of goods comprises a predetermined quantity of goods or services which the user is buying, and may be a single good, or a plurality of goods, for example 1000 individual items. In step 903, the user inputs a referral price, $P_{REF}$ being a cost amount per lot above which any bids must be referred to the user before they can be entered at any of the auctions. As described above, a user who behaves optimally will set $P_{REF}=P_{MAX}$ so that in practice no referral of price occurs back to the user. In step 904, each one of the plurality of N auctions are continuously monitored to check the current active bid prices, where the active bid price is the highest bid price currently operating by any bidder in that individual auction. In general, the current active bid price in each of the plurality of auctions will differ, but in a theoretically 100% efficient marketplace, the currently active bid price in all auctions may be the same. In step 905, for each auction i the algorithm considers the top $M_i$ bids $$b_1^i, \ldots, b_{Mi}^i$$

where $b_1^i \geq b_{Mi}^i$

For each auction, the top $M_i$ bids are stored in a table, with the highest bid price (the highest currently active bid price which would be successful in any auction) $b_1^i$ at the top of the data table and the lowest active bid price $b_{Mi}^i$ at the bottom of the table, $b_{Mi}^i$ being the lowest bid price in the auction which would succeed in buying the goods or services. Further bids in the auction, which are currently unsuccessful (inactive) are labeled $b_{mi+1}^i, b_{mi+2}^i \ldots$ and so on.

The monitoring and trading algorithm maintains a database in memory in which for each of the N auctions which are being monitored, there is stored data describing a price amount for a plurality of individual bids which the algorithm has placed and which are currently active. An active bid is defined herein as a bid which has been placed with an auction entity, and which is of an amount sufficient to secure a trade for that lot of goods or services in the absence of any subsequent higher bids for those same goods or services, and disregarding whether the amount exceeds a reserve price limit set by the auction entity for that same lot of goods or services.

The algorithm may also store connected with the active bid information for each lot, further information describing the proposed trade, including for example a description of the goods or services for which the bid is being made, a quantity of individual items for which the bid is being made, that is to say the number of individual items in a lot which is being bid for, a close time by which the bid will be accepted or rejected by the auction entity, and quality information describing a quality of goods or services to be provided. Examples of the types of information which may be stored by the algorithm are illustrated in FIG. 10 herein. The data stored may comprise bid identifier data 1000 being a unique identification code generated by the bid algorithm for a particular bid which has been placed; auction identification data 1001, comprising a URL of the auction in which the bid identified by corresponding respective bid identifier 1000 has been placed; lot identification data 1002, indicating a specific lot of goods or services for which the bid has been placed; description information 1003 comprising a brief description of the goods or services for which the bid has been placed, or alternatively comprising a pointer to a separate table in which a more detailed description may be stored; a lot size, comprising the number of individual items (goods or services) in the lot which has been bid for; a monetary amount bid 1005, including a currency indicator relating to the currency in which the bid has been made, time and date data 1006 at which the bid was made; a closing time of the auction for the particular lot which has been bid for, and a status indicator 1008 describing whether the current bid is in an active or inactive state.

In step 907, the monitoring and trading algorithm sums the number of bids, being one bid per specified lot, for the specified goods/services of the same type currently active, in all the selected auctions. For example, referring to FIG. 10, there are 5 bids active for lots of ten thousand 10k resistors, all of which are currently active, and spanning two individual auctions. In this example, the lot size is ten thousand individual resistors, and the price per lot which has been bid varies from $25 to $28. If $L_i$ is the number of bids currently active which have been placed by the bidding device (in the example of FIG. 10 for the 10 k resistor lots), $L_i$ equals 5, then if for all auctions i=1 to N, then if the total number of bids L, is greater than or equal to M as determined in step 908, then no further bids are placed and the algorithm continues to monitor each of the plurality of N auctions in step 904 and continues with subsequent steps 905–907. However, in step 908 the number of current active bids for all auctions is less than the total number of lots of goods or services to be obtained, that is to say:

$$\sum_{i=1}^{N} L_i \leq M \qquad \text{Equation 1}$$

Then, the algorithm places additional bids according to a bid selection algorithm hereinafter described with reference to FIG. 11, so that an additional Q active bids are held by the trading entity, where Q is determined in equation 2 below.

Figure 11:
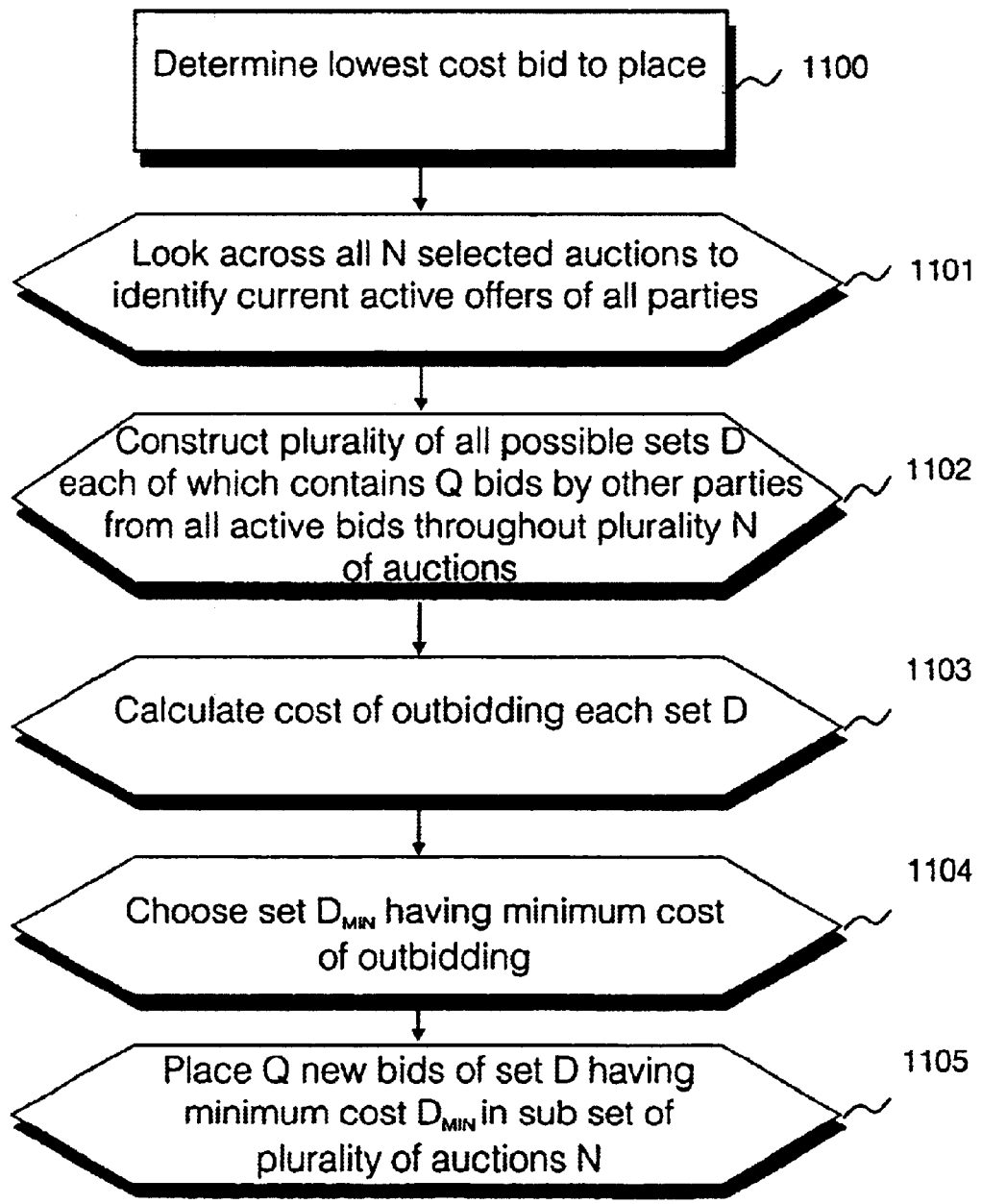
FIG. 11 illustrates schematically a bid selection algorithm for selecting a set of bids to place across a plurality of auction entities.

Referring to FIG. 11 herein, there is illustrated an auction selection algorithm for selecting a subset of the plurality N of selected auctions in which to place new bids. The algorithm in FIG. 11 operates in real time, continuously inputting new bid values from each of the plurality of N auctions as they occur, and placing new bids on an ongoing basis as bids which have previously been placed by the algorithm are overridden by competing bids from third parties.

An object of the algorithm is to determine the lowest cost bids to place in the plurality of auctions N, in order to obtain the required number of lots of goods or services 1100. In step 1101, the algorithm receives input of data describing the current active bids of all of the plurality of N selected auctions. These bids comprise all the bids which, in the absence of any new bids, will be successful in obtaining goods or services (subject to these bids not being below a reserve price set by the auction). These bids are shown schematically in FIG. 12 herein as an array of bids for each auction i of the plurality N auctions. For the purpose of clarity in this example diagram, we assume every auction is selling exactly 4 lots.

$$Q = M - \sum_{i=1}^{N} L_i \leq M \qquad \text{Equation 2}$$

The trading device then determines the optimum least cost bids to place which will result in an additional Q active bids.

In each auction A, there are a plurality of bids which need to be beaten in order to be successful in acquiring a given number of goods j from that auction. A plurality of potential sets of bids are constructed to outbid existing bids in the plurality N of auctions as illustrated in step 1102 herein. The beatable-j set of existing bids in auction A is defined as the set $$(b_{Mi}^{i-i+1}, \ldots b_{Mi}^{i}) \text{ for } j>1 \qquad \text{Equation 3}$$

Figure 12:
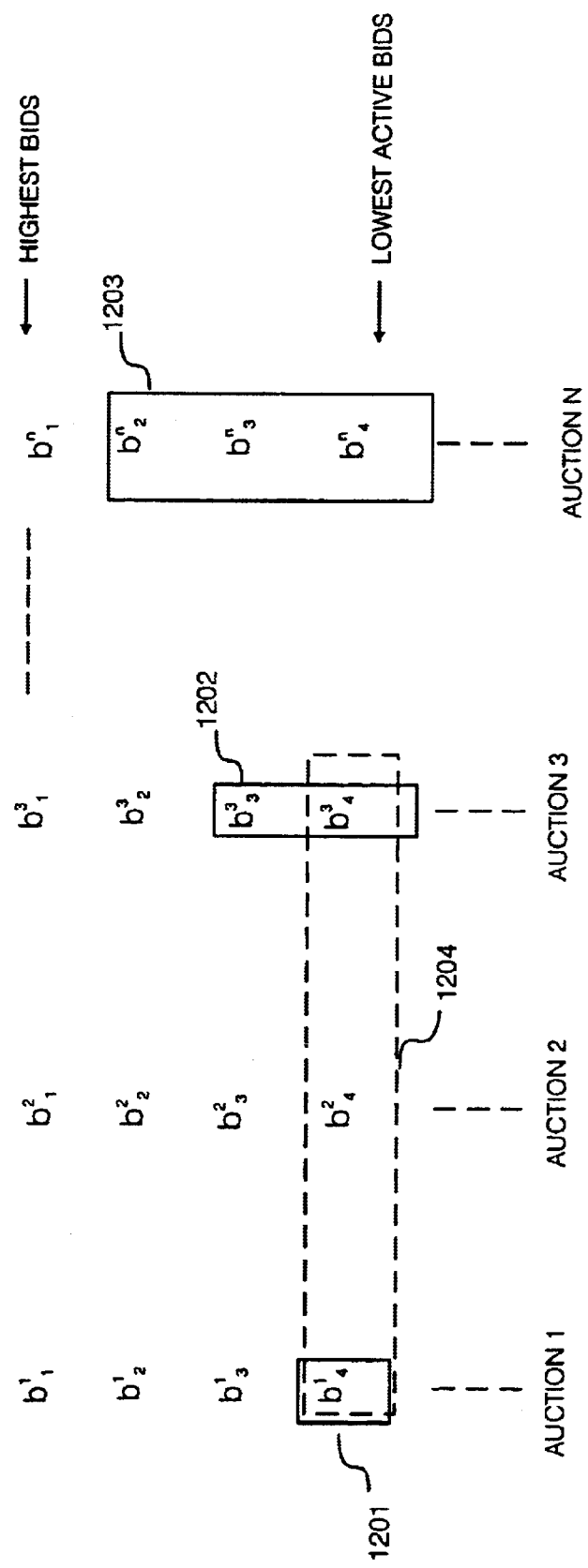
FIG. 12 illustrates schematically an array of bids for each of a plurality of N auctions in which individual sets of bids D are selected.

This is the set of number j lowest bids which would succeed if the auction were terminated immediately. For example, in FIG. 12, 1201 shows the beatable-1 set for auction 1, and 1202 shows the beatable-2 set for auction 3.

The beatable zero (beatable-0) set of bids for any auction is defined to be an empty set of bids.

A plurality of sets of bids can be formed by taking the members of exactly one beatable-j set>0) from every auction $A_i$. The set of all sets which can be formed by taking the members of exactly one beatable-j set (j>0) from every auction $A_i$ is defined as the set □. In FIG. 12 there are illustrated 3 members of □, each with 3 elements;

The set made from the beatable-1 set of auction 1 (1202), and the beatable-2 set of auction 3, and the beatable-0 sets of all other auctions.

The set (1203) made of the beatable-3 set of auction N, and the beatable-0 sets of all other auctions.

The set (1204) made up of the beatable-1 sets of auctions 1, 2 and 3 and the beatable-0 set of all other auctions.

All sets D in the set □ which do not contain exactly Q bids made by parties other than the trading device are deleted.

(1103)—For each set D ∈□ a cost of the set D is defined $$\text{Cost}(D) = \Sigma j_i (b_{mi-ji+1}^{j} + \delta_i) - \sum_{i=1}^{N} b \qquad \text{Eqaution 4}$$

$$b \in D_A$$

Where $D_A$ is the set of bids in set D made by the trading device and $j_i$ is the number of the highest bid which has been chosen by the algorithm in a particular set of bids of a selected auction $A_i$.

Figure 13:
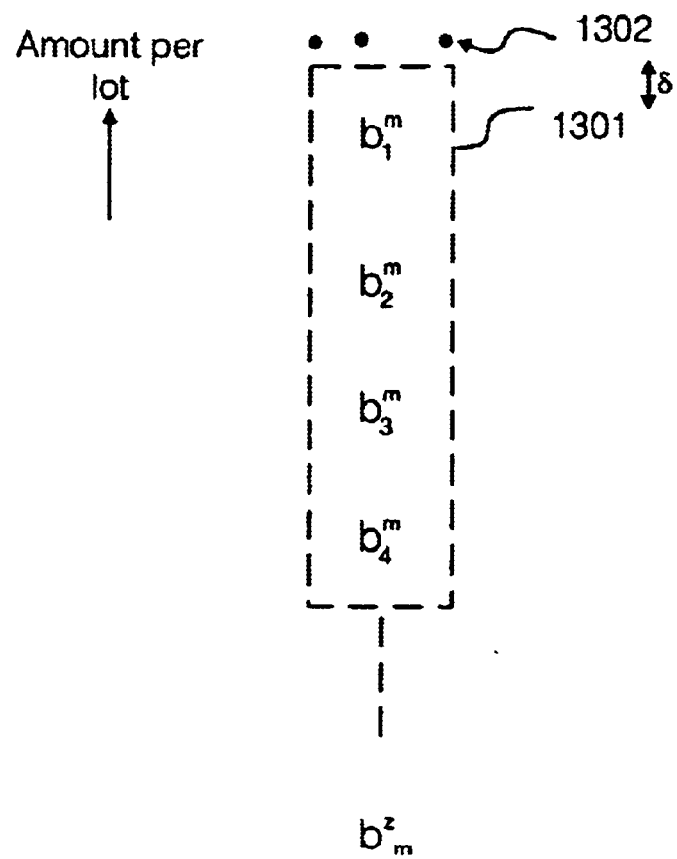
FIG. 13 illustrates schematically an example of a specific set of bids selected exclusively from a single auction.
Figure 14:
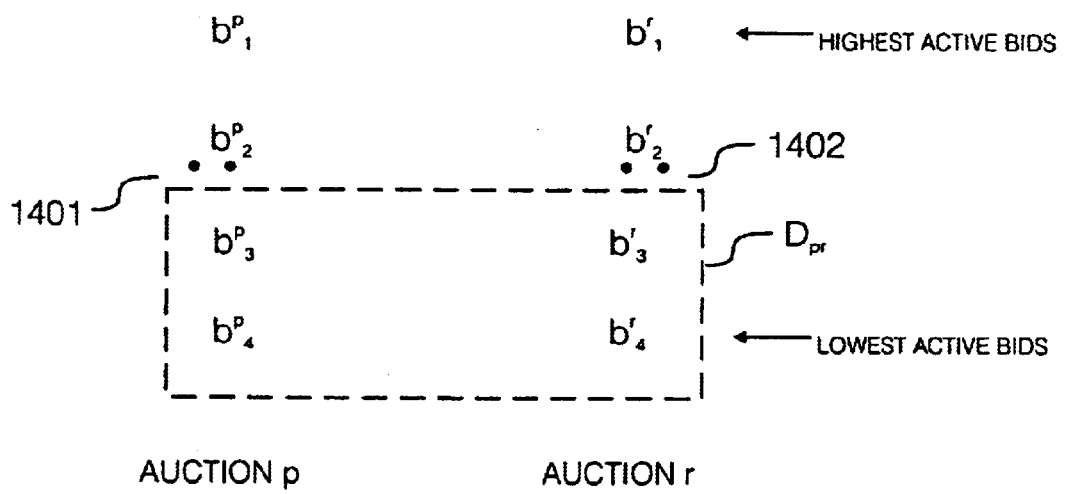
FIG. 14 illustrates schematically a set of bids comprising 4 bids, placed in 2 auctions at levels which outbid currently active bids of third parties in those auction entities.

Equation 4 calculates the cost of outbidding each beatable-j set in D by placing j new bids of value $b_{mi+ji+1}^{i}+\delta_i$, and subtracts the cost of existing bids in these sets made previously by the bidding device. This is illustrated schematically in FIG. 13, for a simple case where Q=4, and the set D comprises the highest 4 bids in a single auction. In order to be successful in auction M, 4 bids 1302 must be placed, which exceed the highest bid $b_1^{M}$ in auction M. The cost of placing these bids=4 $(b_i^{M}+\delta)$, where 6 is the minimum bid increment allowable in the auction. Similarly, in another example illustrated schematically in FIG. 14 herein, there is shown another set $D_{pr}$ comprising a number Q=4 bids, placed in order to outbid the currently active bids of third parties in auctions P and R. To be successful in auctions P and R, 4 bids need to be placed 1401, 1502, 1402, being 2 bids of an amount $b^{P}_{3}+\delta$ in first auction P, and 2 bids each at an amount $b^{r}_{3}+\delta$ in auction R, giving a total cost 2($b^{P}_{3}+$ $b^r_3+\delta_P+\delta_R)$ for the bid set $D_{PR}$, where $b^P_3$ is the second lowest currently active bid price in first auction P, $\delta_P$ is the minimum bid increment in first auction P, $b^r_3$ is the second lowest currently active bid price in second auction R, and $\delta_R$ is the minimum bid increment in second auction R.

$\delta_i$ is the bid increment, which is specified by a particular auction. Bid increment data is obtained by a parser in the monitoring algorithm which reads the bid data directly from the auction entity, the data being transferred in a language such as HTML or XML.

(1104)—A set of bids having a minimum cost $D_{MIN}$ is obtained by choosing $D_{MIN} \in \forall$ such that $$\text{Cost } (D_{MIN}) \leq \text{Cost } (D) \quad \text{Equation 5}$$

$\forall D \in \square$

If more than one set satisfies equation 5, then the latest auction finish times in each set are considered. The set with the earliest such finish time is chosen.

In step 1105 the algorithm then proceeds to deploy those bids in the relevant auctions at the appropriate calculated levels, as long as those bids are below the referral price $P_{REF}$ set by the user. Any new bids which are calculated by the algorithm which are above the referral price $P_{REF}$ will be referred back to the user. Under no circumstances will new bids be placed where the amount is greater than the maximum price limit $P_{MAX}$. If all bids are placed, this will result in $j_i$ bids of amount $b^i_{mi-ji}+\delta_i$ being placed in each auction $A_i$.

As a further example, an agent may participate in many auctions selling similar goods, spread out between many auction houses and wishes to purchase m goods in these auctions, and is given a valuation of v on each good by its user. To do this, the agent monitors the set of auctions currently progressing. For each auction $a_i$, it observes the n(i) highest bids. In other words, it observes the values of the bids that, if the auction terminated immediately, would result in a successful purchase. These bids are labelled $\{b_1^i, \ldots, b_{n(i)}^i\}$, where $b_1^i$ is the highest bid in the auction, and $b_{n(i)}^i$ is the lowest bid which would currently succeed. We refer to these as the currently active bids. To represent the reservation price r, we assume that the seller places n(i) bids of value r–$\epsilon$, where $\epsilon$ is the minimum bid increment.

In this example, our agent is attempting to purchase 5 discount PCs of a given specification, and is willing to bid up to 150 for each. There are 3 auction houses, each running one auction to sell PCs of this specification. Auction $a_i$ is selling 4 PCs, auction $a_2$ is selling 3 PCs and auction $a_3$ is selling 2 PCs. In this example all auctions have a minimum bid increment of 5.

Auction $a_1$ currently has the following bids registered (Underlined bids are held by our agent);
100 95 90 90 80 60

As the auction is for 4 items, the agent observes the 4 highest bids, $\{b_1^{1=100}, b_2^{1=95}, b_3^{1=90}, b_4^{1=90}\}$ Auction $a_2$ has the following bids registered;
95 85 85 80 70

The agent observes the bids $\{b_1^{2=95}, b_2^{2=85}, b_3^{2=85}\}$

Auction $a_3$ has the following bids:
100 95 95 80

Our agent holds 2 active bids, and so needs to place bids to gain an additional 3.

L is the number of currently active bids that are held by our agent. (Initially, L will be zero.) To ensure the agent makes m purchases, it needs to make new bids that result in it having an additional (n-L) active bids. This may require it to make more than (m-L) bids, as it may need to outbid itself.

If the agent is to hold j active bids in auction $a_i$ it must place bids that beat the lowest j of the currently active bids. We define the beatable-j list for auction $a_i$ to be the ordered set of these bids—namely bids $\{b^1_{n(i)-j+1}, \ldots, b^i_{n(i)}\}$. To beat the bids in this list, the agent must place j bids of value $b^i_{n(i)-j+1}+\delta$ where $\delta$ is the minimum bidding increment. The incremental cost to the agent of placing these bids, if successful, above the cost that it would have incurred in auction $a_i$ previously, is $j*b^i_{n(i)-j+1}+\delta-\{$sum of previous bids in $a_i\}$. The beatable-0 list of any auction is defined to be the empty set, and has incremental cost of zero. Obviously, an auction for q goods has no beatable-j lists for j>q.

In this example, the beatable-1 list of auction $a_2$ is $\{85\}$, with incremental cost 5 (as it already holds that bid). The beatable-2 list is $\{85, 85\}$, with incremental cost 95. Similarly the beatable-3 list is $\{95, 85, 85\}$, with incremental cost 195.

The agent now constructs potential bid sets. A bid set is a set of beatable-j lists that satisfies the following criteria;

1. The set contains exactly one beatable-j list from each auction.
2. The beatable-j lists contain, in total, exactly (m-L) bids made by parties other than our agent.

In other words, each bid set represents one possible way of placing bids to ensure that our agent will gain an additional (m-L) active bids, and therefore will hold exactly m active bids. We define the incremental cost of each of these bid sets to be the sum of the incremental costs of the beatable-j lists in it.

Therefore, our agent needs to find bid sets containing exactly 3 bids made by parties other than it. An example bid set satisfying the above criteria would be;

$[\{90\}, \{85, 85\}, \{100, 95\}]$.

This set is made from the beatable-1 list of auction $a_1$, and the beatable-2 lists of auctions $a_2$ and $a_3$. Its incremental cost is 300.

The agent must generate the bid set with the lowest incremental cost. In addition, it must avoid generating bid sets that contain a bid equal to or greater than its valuation of the good, v. Various algorithms can be used to do this. The simplest is to generate all possible bid sets, filter out those containing bids greater than v, and select the one with lowest cost. However, this is clearly inefficient, and alternative search techniques could be used. For example, a depth first strategy through the space of possible bid sets, pruning areas of the search space which are higher cost than the best solution found so far. If there is more than one bid set with identically lowest cost, the agent chooses one arbitrarily. If no such bid sets exist, the agent finds the smallest i such that at least one bid set exists which contains (m-L-i) bids made by parties other than the agent. Given this i, the agent chooses the bid set with the lowest incremental cost.

Having generated the bid set with the lowest cost, the agent places bids in each auction. For each beatable-j list $\{b_{n(i)-j+1}, \ldots, b^i_{n(i)}\}$ the bid set, the agent places j bids of value $b^i_{n(i)-j+1}+\delta$ the corresponding auction $a_i$.

In our example, the bid set with lowest cost is $[\{90, 90\}, \{85, 85\}, \{\ \}]$ This set has cost 285. The agent therefore places two bids of 95 in auction a, and two bids of 90 in auction $a_2$.

The agent continues to monitor the auction, and repeats its analysis if other parties place new bids. In this way, the agent ensures it maintains m active bids at the least possible cost to itself, unless doing so requires it to place bids above its valuation of the good. Providing all auctions terminate simultaneously, this will result in it buying the goods at the best price possible, given the competition in each auction.

Where the auctions terminate at different times the above example may not behave optimally.

The agent needs a mechanism for determining whether to remain in an auction which is about to close, even when there are other auctions with lower current bid prices.

To determine whether the agent should remain in an auction which is about to close, even when there are other auctions with lower current bid prices, it must be able to make a trade-off in terms of expected value between the relative certainty of remaining in an auction about to close, against the risk of participating in a newer auction. The newer auction may result in a lower purchase, or may result in a far higher purchase price above the agent's valuation of the good.

In this example the mechanism that is used combines simple learning with utility theory. The agent uses learning to build a model of the spread of valuations held by participants in different auction houses. Then, based on its beliefs about these valuations, it calculates the utility of likely participation in persisting auctions, and compares this with the certain outcome in the terminating auction. If the terminating auction has a higher utility, it remains a participant and makes the purchase. If the remaining auctions have higher expected utility, it withdraws from the terminating auction and continues participation elsewhere.

The agent generates a model of the potential outcome of auctions by creating a model of each auction house. For a given auction house and a given type of good, it creates a belief function $B(x,q)$ representing the probability that $x$ bidders value the good with a valuation greater than $q$ in a given auction for that good. It builds up this function by monitoring auctions for the good conducted by the auction house. Various possible learning techniques can be used to generate this function. The exact choice will depend on the underlying dynamics of the demand for the good under consideration. Three examples of possible functions are static demand, drifting demand and semi-static demand.

For static demand if the demand for the good is unchanging, a simple function which gives equal weight to evidence from each auction will suffice. It can be specified iteratively—the initial beliefs after one auction $B_1(x,q)$ are defined, and the beliefs after the t+1th auction $B_{t+1}(x,q)$ are defined in terms of the beliefs $B_t(x,q)$ held prior to the auction.

$B_1(x,q)=1$ if $x$ or more bidders have placed a bid of $q$ or greater in the first auction observed, 0 otherwise.

$B_{t+1}(x,q)=((t\ B_t(x,q)+1)/(t+1)$ if $x$ or more bidders have placed a bid of $q$ or greater in the t+1th auction observed, $tB_t(x,q)/(t+1)$ otherwise For drifting demand, if the demand for the goods changes slowly with time, it is necessary to reduce or eliminate the contribution of older auctions on the belief function. This can be done either by specifying a rolling window of time and discarding evidence from auctions earlier to this, or by using a time discount factor that reduces the weight given to older auctions.

In a semi-static environment, the demand remains fixed for a period of time, and then suddenly alters to a new level (for example, because of the arrival of a new group of buyers because of a publicity campaign.) In such an environment, it is necessary for the learning algorithm to identify when such a change has occurred, and to discard evidence from auctions prior to the change. This can be done by observing predictions from the belief model, and how they compare with the actual outcomes. If they are radically different over several auctions, a reset should take place.

Using these functions, we can estimate the probability that a bid of a certain value will be successful in an auction by a given auction house. Consider an auction for n goods, in which our agent wishes to purchase one. The probability that a bid of q by our agent will be successful can be estimated to be $1-B(n,q)$; i.e. 1 minus the probability that n other bidders are prepared to outbid our agent.

For an English auction, however, this approach may require modification as an English auction reveals nothing about the valuations of successful bidders. In other words, if a bidder makes a successful bid of x, we cannot be sure how much higher they may have been willing to bid. To take account of this, it is necessary to add some kind of heuristic weighting to the belief function—we must increase the value of a successful bid by a certain amount, to reflect this possible willingness to bid higher. One possibility is to add a small random amount to each successful bid. In some domains, it may be possible to use econometric data to determine accurately the range that this should be drawn over, while in other domains it may be necessary to use a heuristic estimate.

We now consider how this belief function can be used to compare the expected payoff of an auction that is about to terminate with the less certain outcome of other auctions that terminate later. For the sake of clarity and brevity, we present the technique assuming our agent wishes to purchase a single good. The expected payoff from the terminating auction is simple to calculate. Assuming our agent is holding an active bid q, or is able to place one at the last moment, then the payoff will be $(v-q)$. If the agent is unable to place a bid because all active bids are beyond its valuation of the good, then payoff will be zero and the agent is forced to participate in other auctions.

For example an agent is purchasing one good from one of two auctions. Auction $a_1$ is nearing completion, while auction $a_2$ is continuing. Each auction is for 2 goods, and is run by separate auction houses. The active bids are as follows:

| | | |
|---|---|---|
| Auction $a_1$: | 130 | 125 |
| Auction $a_2$: | 115 | 110 |

Our agent values the good at 200, so could continue bidding in auction $a_1$.

The expected payoff of continuing to participate in the non-terminating auctions is more complex to calculate. To do this, we use the belief function to calculate the probability our agent will be able to make a purchase at various possible bid prices. For a given bid price q, the probability our agent will make a successful bid in an auction run by a given auction house is $1-B(n,q)$, where n is the number of goods being sold. Similarly, the probability that our agent will be able to make a successful bid at a lower price, q−1, is $1-B(n,q-1)$. Hence, the probability that our agent will succeed with a bid of q and no lower is $B(n,q-1)-B(n,q)$. The utility of this outcome will be $(v-q)$. Hence, we can calculate the expected utility of participating in a given auction as;

$$\sum_{q=0}^{v} [B(n, q-1) - B(n, q)](v-q)$$

Of course, as the auction may already be in progress, it is necessary to take into account the current active bids in that auction. The general belief function $B(x,q)$ for the auction house is therefore adapted for this particular auction an to give B–($a_n$,x,q). If the good being traded is a private value good, and hence all buyers have valuations independent of each other, this is defined as follows;

Let p be the value of the xth highest bid in auction $a_n$
Then B($a_n$,x,q)=B(x,q)/B(x,p) for all q≧p 1 for all q<p Therefore, if our agent has built up the following belief function for the auction house running auction $a_2$;

| q:     | 105 | 110 | 115 | 120 | 125 | 130 | 135 | 140 |
|--------|-----|-----|-----|-----|-----|-----|-----|-----|
| B(2,q):| 1   | 0.8 | 0.7 | 0.6 | 0.6 | 0.5 | 0.3 | 0   |

As there are already bids of 110 and 115, this becomes;

| q:     | 105 | 110 | 115   | 120  | 125  | 130   | 135   | 140 |
|--------|-----|-----|-------|------|------|-------|-------|-----|
| B(2,q):| 1   | 1   | 0.875 | 0.75 | 0.75 | 0.625 | 0.375 | 0   |

As our agent has a valuation of 200, we can calculate the expected utility of this auction to be;

(0.125*85)+(0.125*80)+(0.125*70)+(0.25*65)+(0.375*55)=66.25

Given an expected utility on the remaining auctions, the agent must decide whether to place higher bids in the auction that is about to terminate, or withdraw from it. If we assume that the agent is risk neutral, then it will be willing to bid up to a value where the actual utility of the terminating auction is the same as the highest expected utility among the remaining auctions. In other words, it is prepared to make a maximum bid $b_{MAX}$ of;

$$b_{\max} = v - \sum_{q=0}^{v} [B(n, q-1) - B(n, q)](v - q)$$

Therefore, assuming that $a_3$ has a lower expected utility than $a_2$, our agent will be willing to bid up to (200−66.25)= 133.75 in auction $a_1$. Hence, it will place a bid of 130, and will withdraw if this is outbid. In this case, it will hope to make a better purchase in auction $a_2$.

In this way, the agent is able to make informed decisions about whether to continue bidding in an auction or to switch. If it is making multiple purchases, it may purchase some in the terminating auction, and choose to switch others to continuing auctions.

By interleaving the application of two algorithms of the form described above, our agent can effectively participate in multiple English auctions. It will use the coordination algorithm to place lowest possible bids across auctions. It will use the bid withdrawal algorithm to determine when it is worth bidding higher in an auction that is about to terminate, as opposed to transferring to other auctions where the active bids are currently lower.

Additionally the example may be enhanced by, for example using:

1) A more sophisticated learning mechanism. This may be generic, or could be tailored to the specific dynamics of a particular market.
2) The buyers risk could be generalised to allow the agent to adopt other risk attitudes as appropriate.
3) The account time discounting or deadlines could be generalised.
4) The value of all goods could be generalised to allow the agent to receive a demand curve from its user.
5) The deviation of actual auctions from the predictions could be measured.

This could make it possible to give a measure of confidence in the belief. This could be used to moderate the agent's decision to switch auctions, taking into account the agent's attitude to risk.

6) It may be appropriate to also to model the possibility that an auction house may bring new auctions into being, and the potential payoff of such auctions.

Figure 15:
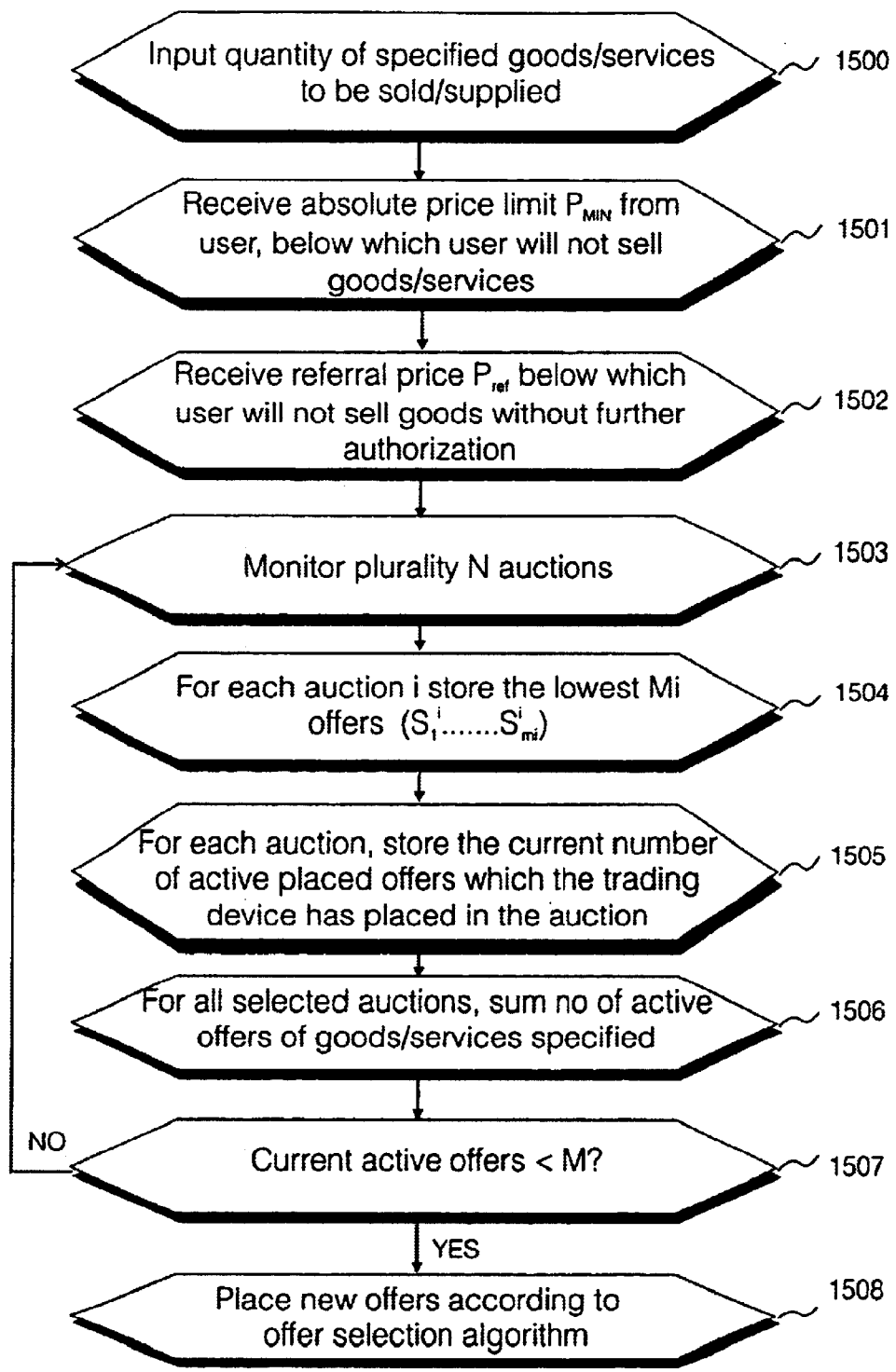
FIG. 15 illustrates schematically an offer selection algorithm for selecting a set of offers to be made in a plurality of auction entities.

Referring to FIG. 15 herein, there is illustrated schematically an offer selection algorithm for selecting a set of offers to sell a plurality of lots of goods or services in a plurality of various auctions purchasing goods or services from the trading device. The trading device attempts to sell goods by making offers to a competitive tender. Hence the auctioneer is putting out goods to competitive tender. The auctioneer will never receive bids, only offers.

The offer selection algorithm illustrated in FIG. 15 operates where a plurality N of auction entities request goods or services sold by the trading device 400 which offers those goods and/or services for sale. Each individual auction i buys a quantity M, lots of goods or services. That is to say each auction entity i posts on its website details of the quantity of lots of goods or services which it wishes to acquire, and posts a call for offers for each of those lots of goods or services.

The trading device 400 places a plurality of offers with a selection of a plurality of N auction entities. The number of individual offers, the particular auction with which the offer is placed, and the amount of the offer are determined by the offer selection algorithm illustrated schematically in FIG. 15 herein.

The trading device monitors the plurality N auctions, each auction entity wishing to acquire a quantity $M_i$ goods, the number $M_i$ varying from auction to auction in the general case.

In step 1500, the user inputs details defining the quantity of goods or services M required to be sold or supplied into the trading device 400 using the user interface. These details are stored in local memory in the trading device for further reference. In step 1501, the user inputs an absolute price limit $P_{MIN}$ for each lot of goods or services which are to be sold, the absolute price limit $P_{MIN}$ being the price below which the user is unwilling to sell or supply the goods or services. A separate price limit $P_{MIN}$ is input for each lot of goods or services to be sold or supplied. The data describing the minimum offer price $P_{MIN}$ is stored in memory by the trading device. In step 1502, the user inputs a referral price data $P_{REF}$, for each lot of goods or services which are to be sold or supplied. The referral price is the price below which the trading device cannot operate automatically, but must refer all offers which it makes to the plurality N of auctions back to the user via the user interface, before proceeding to place those offers. A user behaving optimally will set the minimum price $P_{MIN}$ to be the same as the referral price $P_{REF}$, so that in practice the trading device once instructed to sell items does not refer back to the user. In step 1503, the trading device monitors the plurality of N auctions, by parsing data from the websites operated by those auction entities, the data describing the quantity, and offer price for goods or services of the type specified in step 1500. Auction entities may be selected on the basis of reliability, settlement terms, delivery terms, and trading history. In the best mode implementation, a user will personally select the plurality of N auction entities from which the price calculation algorithm can choose, rather than leaving the selection process to a further set of auction selection algorithms 702.

In step 1504, the algorithm monitors a plurality of offers from each of the plurality N auctions, receiving the lowest current offers in each auction i of the plurality. Where a large number of offers are posted by an auction entity, the algorithm may be configured to only receive from each auction at most a number of lowest offers $S_1^i, \ldots S_{mi}^i$ being the same as the quantity Q of the lots of goods/services to be disposed of. This prevents the trading device becoming flooded with large quantities of offer data from the plurality of auction entities. Auction entities may be preselected by the user in a similar fashion as described herein above with respect to an operation by the trading device.

In step 1504 for each auction i the lowest M, offers $S_1^i, \ldots S_{mi}^i$ are stored. In step 1505, for each auction, the current number of active placed offers which the trading device has placed in the auction are stored. In step 1506, for all selected auctions, the number of active offers of goods/services specified are summed. In step 1507, if the number of current active offers is greater than M, then the algorithm returns to step 1503 and the monitoring process is continued. However, in step 1507, if the number of current active offers is less than M, then in step 1508 the algorithm proceeds to place a set of new offers according to the offer selection algorithm.

Figure 16:
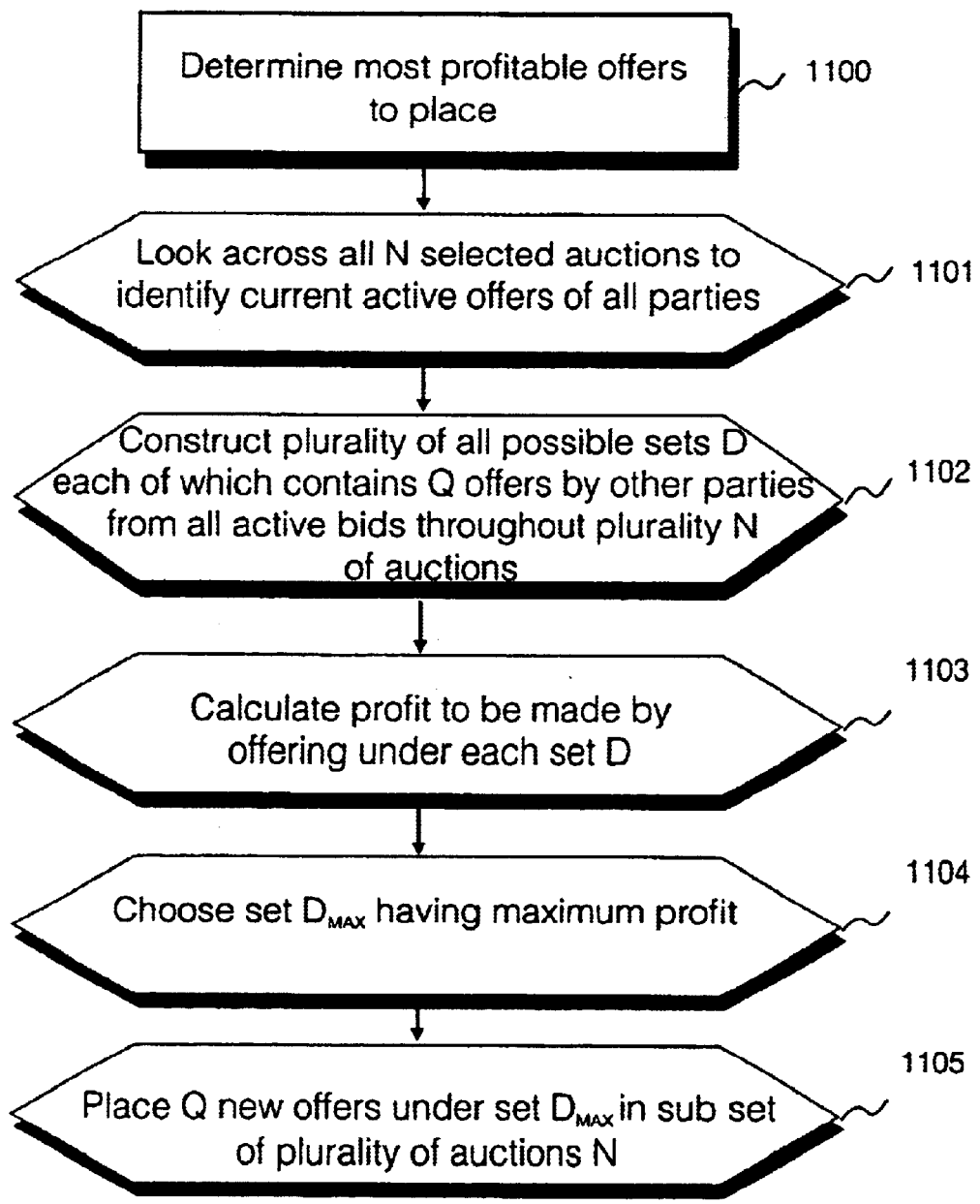
FIG. 16 illustrates schematically a method for determining an optimum set of bids to place with one or a plurality of auction entities.
Figure 17:
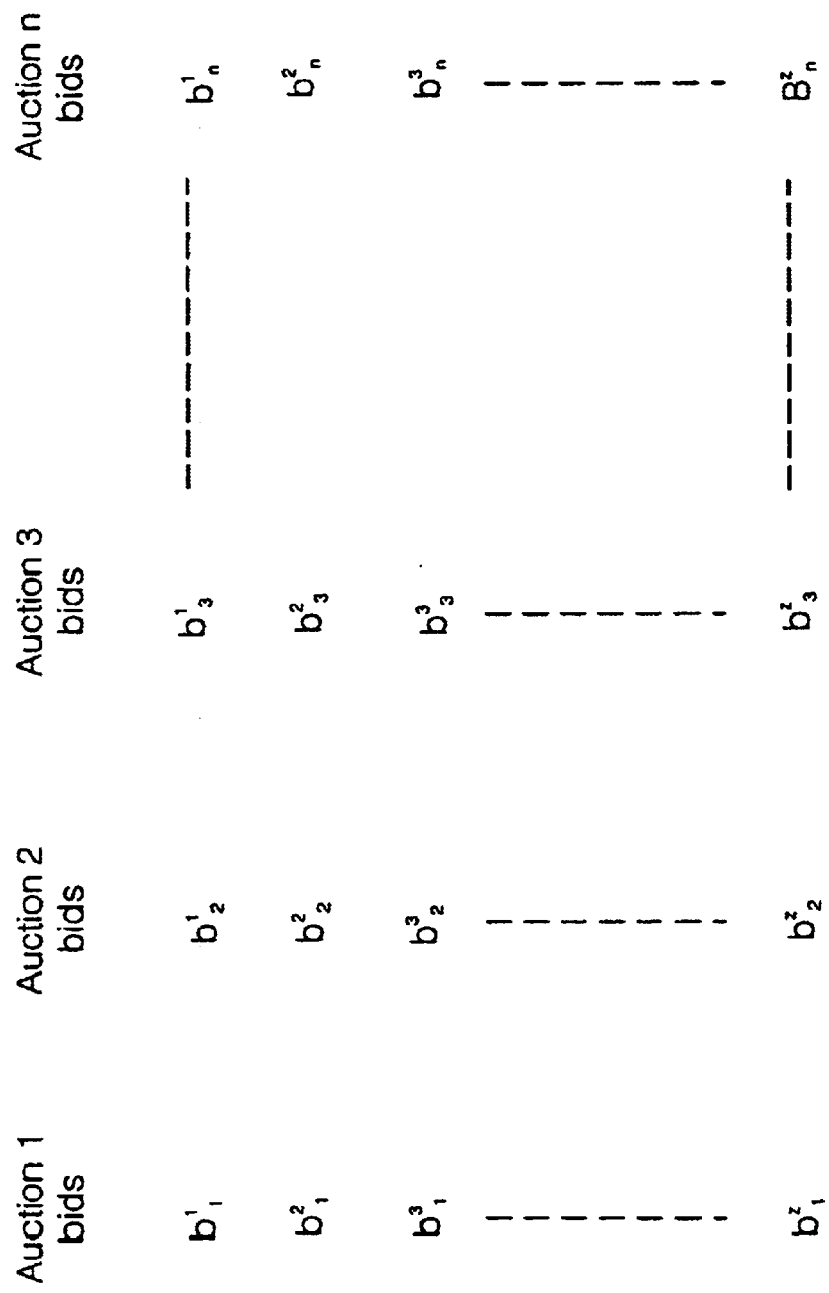
FIG. 17 illustrates schematically a set of bids which may be displayed by a plurality of auction entities and stored by a trading entity according to a specific embodiment of the present invention.
Figure 18:
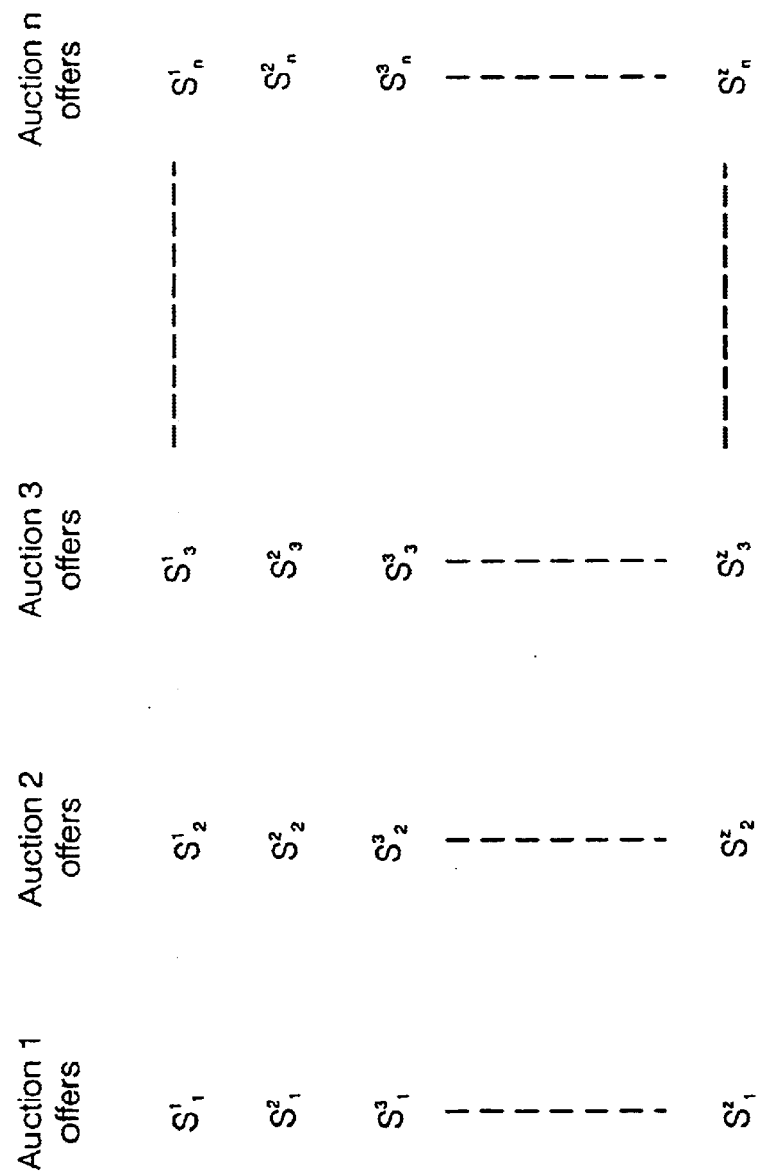
FIG. 18 illustrates schematically a set of offers which may be generated by the trading entity, to match with a set of bids as illustrated in FIG. 17 herein.

Selection of individual auctions with which to trade are chosen from the selected plurality N of auctions, and the prices at which those trades occur is carried out by the offer selection algorithm illustrated with reference to FIG. 16 herein. The basis for operation of the algorithm of FIG. 16 is as follows.

In step 1601, the plurality N of preselected auctions are monitored by parsing data from the websites of those auction entities. Offer data $S_1^i, \ldots, S_N^i$, for a plurality of individual offers S for each auction $A_i$, up to the maximum number of auctions N is received by the trading device, suitably in HTML, or XML languages.

For an auction $A_i$, a beatable-j set of offers is defined as being:

$$(S_{mi-j+1}^i, \ldots S_{mi}^i) \text{ for } j \geq 1.$$

The beatable-0 set for any auction is defined to be the empty set.

In step 1602, there are generated all sets of offers which can be formed, by taking the members of exactly one beatable-j set (j>0) from every auction $A_i$. Let 0 be the set of all such sets.

All sets in □ which do not contain a number exactly Q of offers made by parties other than the trading device are deleted or ignored in step 1603. The remaining offer sets each having Q members are selected in step 1604.

For each set, D ∈□ a profit D is defined as $$\text{Profit}(D) = \sum_{i=1}^{N} j_i (S_{mi-ji+1} + \delta) - \sum_{S \in D_A} S \quad \text{Equation 6}$$

Where $D_A$ is the set of offers in set D made by the trading device.

In step 1605, a maximum offer set $D_{MAX}$ is selected by choosing $D_{MAX} \in \phi$ such that $$\text{Profit}(D_{MAX}) \geq \text{profit}(D)$$

for all D∈□.

In step 1606 offers are deployed in the plurality of auctions by placing j offers each of amount $$S_{mi+j-1}^i - \delta$$

in each auction $A_i$, where δ is an offer increment selected by the user or specified by the auction site.

Once the offers are placed with the selected auctions, then provided no competing offers are made by third parties at a lower price than those made by the trading device, then the offers should be accepted by the selected auctions.

Different numbers of lots of goods or services may be accepted by different auction entities, possibly at different times. Thus, the algorithm of FIG. 16 may dynamically and continuously loop back to step 1601 further monitoring the plurality of N auctions, reviewing any offers which have not yet been accepted. If an offer is accepted, then for that particular offer which is accepted, settlement occurs in step 1608, by the algorithm confirming by a message to the auction entity concerned that the offer has been accepted. This message forms a legally binding contract between the trading device and the auction entity. Payment and delivery may occur by conventional means, for example physically shipping the goods, and making a credit card transaction, or electronic funds transfer by conventional means. In the best mode implementation described herein, settlement of trades may be delegated to a human user for actual implementation.

What is claimed is:

1. A computer program operating in a trading device, the computer program comprising:
   logic for selecting a plurality of auction entities operating auctions simultaneously that include similar goods or services for trading;
   logic for monitoring at least active bids of each of the goods or services from each of the plurality of auction entities;
   logic for processing the monitored active bids plus a respective bid increment to determine a plurality of bids, each bid for outbidding each of the monitored active bids respectively;
   logic for selecting a lowest bid from the determined bids, wherein when at least two of the plurality of the bids are equal, the logic for selecting further comprises logic for selecting the lowest bid having an earliest auction finish time; and
   logic for communicating the selected bid to the respective auction entity.

2. The computer program of claim 1, wherein the logic for communicating further comprises:
   logic for determining from the active bids whether the active bid on each of the auction entities has been placed by the trading device or by another party; and
   logic for submitting the selected bid to the respective auction entity only when the active bid on each of the auction entities has been placed by the other party.

3. The computer program of claim 1, further comprising logic for receiving user input regarding a maximum price limit $P_{MAX}$ establishing a price above which the trading device will not bid.

4. The computer program of claim 3, wherein the logic for processing determines whether the selected bid exceeds $P_{MAX}$ and instructs the trading device not to bid when the selected bid exceeds $P_{MAX}$.

5. The computer program of claim 1, further comprising logic for receiving user input regarding a referral price limit $P_{REF}$ establishing a price above which the trading device refers back to the user for receiving further bidding instructions.

6. The computer program of claim 5, wherein the logic for processing determines whether the lowest possible bid exceeds $P_{REF}$ and refers back to the user when the lowest possible bid exceeds $P_{REF}$.

7. The computer program of claim 1, wherein:
the logic for selecting selects the plurality of auction entities further comprises logic for selecting a set of said similar goods or services for trading, wherein the set corresponds to a specified number of goods or services to be acquired;
the logic for processing further comprises logic for determining a set of selected bids for outbidding a set of active bids on the auction entities, the set of active bids corresponding to a group of the active bids having a lowest total cost; and
the logic for submitting the selected bid further comprises logic for submitting the set of selected bids to the respective auction entities.

8. The computer program of claim 7, further comprising:
logic for receiving from a user a maximum price limit per good or service to establish a total price of the set of said goods or services above which the trading device will not bid for the set of said similar goods or services.

9. The computer program of claim 1, wherein the similar goods or services for trading comprises at least one lot of similarly manufactured units.

10. The computer program of claim 1, further comprising logic for determining auction finish times of the respective auction entities.

11. The computer program of claim 10, further comprising logic for calculating a potential bidding outcome of the respective auction entities based on the auction finish times.

12. The computer program of claim 1, wherein the logic for monitoring further comprises logic for monitoring a finish time of the active bids.

13. The computer program of claim 1, wherein the logic for monitoring further comprises logic for monitoring bid identifier data of the active bids.

14. The computer program of claim 1, wherein the logic for monitoring further comprises logic for monitoring auction identification data of the active bids.

15. The computer program of claim 1, wherein the logic for monitoring further comprises logic for monitoring lot identification data of the active bids.

16. The computer program of claim 1, wherein the logic for monitoring further comprises logic for monitoring description information of the active bids.

17. The computer program of claim 1, wherein the logic for monitoring further comprises logic for monitoring a monetary amount of the active bids.

18. The computer program of claim 1, wherein the logic for monitoring further comprises logic for monitoring a status indicator of the active bids.

19. The computer program of claim 1, wherein the computer program operates on a real time basis wherein the logic for monitoring, processing, selecting and communicating is repeated such that at least one new bid is placed after a previously communicated selected bid is overridden by a competing bid for a third party.

20. A method comprising:
receiving a specification of multiple auction entities residing on websites, the auction entities accessible via a network, each auction entity including an item open for bid similar to an item simultaneously open for bid on the other auction entities;
monitoring a highest bid for the item on each auction entity;
determining a lowest possible bid to outbid one of the highest bids on a respective auction entity, wherein determining the lowest possible bid further comprises:
comparing outbid values for each auction entity, each outbid value being sufficient to outbid the highest bid on the respective auction entity and being based on the highest bid and a minimum bid increment for each auction entity;
selecting the lowest outbid value;
determining whether the lowest outbid value corresponds to more than one auction entity; and
when the lowest outbid value corresponds to more than one auction entity, selecting the lowest outbid value from the auction entity with an earliest termination time; and
placing said lowest possible bid with the respective auction entity.

21. The method of claim 20, wherein monitoring the highest bid further comprises determining whether one of the highest bids corresponds to a bid placed by said placing said lowest possible bid.

22. The method of claim 20, wherein selecting multiple auction entities further comprises receiving a user request to select the auction entities.

23. The method of claim 20, wherein selecting multiple auction entities further comprises searching a network for the auction entities.

24. The method of claim 20, further comprising:
enabling a user to select an auction in which to participate.

25. The method of claim 20, further comprising:
ensuring that a user has a leading bid in one of the auction entities.

26. The method of claim 20, wherein the receiving, monitoring, determining, and placing is repeated such that at least one new bid is placed after a previously placed lowest possible bid is overridden by a competing bid placed by a third party.

27. A trading entity in a trading system, the trading entity comprising:
a first module configured to select a plurality of auction entities, each auction entity providing a good or service up for bid that is similar to a good or service simultaneously up for bid on the other auction entities;
a second module configured to monitor the highest active bid for the similar good or service on each auction entity;
a third module configured to process the highest active bids to calculate a lowest possible bid for outbidding one of the highest active bids; and
a fourth module configured to receive a user input indicating a quantity Q of the similar goods or services on which to bid, wherein:
each auction entity (i) provides a number $N_i$ of the similar goods or services up for bid;
the second module is further configured to monitor the $N_i$ highest active bids on each auction entity; and
the third module is further configured to process the $N_i$ highest active bids on each auction entity to calculate the Q lowest possible bids for outbidding the highest active bids on the auction entities.

28. The trading entity of claim 27, wherein the third module is further configured to calculate said lowest possible bid based on the highest active bid and a minimum bid increment for the good or service on each auction entity.

29. The trading entity of claim 27, wherein the third module is further configured to ensure that the user has Q leading bids on the auction entities.

30. The trading entity of claim 27, wherein the first module, second module, third module and fourth module operate on a real time repeated basis such that at least one new bid is placed after a previously submitted lowest possible bid is overridden by a competing bid for a third party.

31. A trading entity in a trading system, the trading entity comprising:
 a first module configured to select a plurality of auction entities, each auction entity providing a good or service up for bid that is similar to a good or service simultaneously up for bid on the other auction entities;
 a second module configured to monitor active bids for each of the similar good or service on each auction entity;
 a third module configured to process the monitored active bids plus a respective bid increment to determine a plurality of bids, each bid for outbidding each of the monitored active bids respectively;
 a fourth module configured to select a lowest bid from the determined bids, wherein when at least two of the plurality of bids are equal, the logic for selecting further comprises logic for selecting the lowest bid having an earliest auction finish time.

32. The trading entity of claim 31, further comprising a sixth module for placing the lowest bid with the respective auction entity.

* * * * *